United States Patent
Kim et al.

(10) Patent No.: US 9,769,628 B2
(45) Date of Patent: Sep. 19, 2017

(54) METHOD AND APPARATUS FOR TRANSMITTING AND RECEIVING MBSFN SUBFRAME

(71) Applicant: LG Electronics Inc., Seoul (KR)

(72) Inventors: Bong Hoe Kim, Seoul (KR); Suck Chel Yang, Seoul (KR); Yun Jung Yi, Seoul (KR); Dong Youn Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 14/368,193

(22) PCT Filed: Dec. 23, 2013

(86) PCT No.: PCT/KR2013/012045
§ 371 (c)(1),
(2) Date: Jun. 23, 2014

(87) PCT Pub. No.: WO2014/119847
PCT Pub. Date: Aug. 7, 2014

(65) Prior Publication Data
US 2015/0146604 A1 May 28, 2015

Related U.S. Application Data

(60) Provisional application No. 61/759,416, filed on Feb. 1, 2013, provisional application No. 61/762,326, filed on Feb. 8, 2013.

(51) Int. Cl.
*H04W 4/06* (2009.01)
*H04W 72/04* (2009.01)
(Continued)

(52) U.S. Cl.
CPC .............. *H04W 4/06* (2013.01); *H04L 1/0046* (2013.01); *H04L 1/1671* (2013.01);
(Continued)

(58) Field of Classification Search
CPC ....... H04W 72/005; H04W 4/06; H04W 8/26; H04L 12/189; H04L 12/185
(Continued)

(56) References Cited

U.S. PATENT DOCUMENTS 8,477,675 B2 * 7/2013 Cai .................. H04B 7/155
370/312
8,660,049 B2 * 2/2014 Katayama ............. H04L 5/0032
370/312
(Continued)

FOREIGN PATENT DOCUMENTS

CN 102611993 A 7/2012
EP 2654325 A1 10/2013
(Continued)

OTHER PUBLICATIONS

Qualcomm Inc., 'Resource Allocation Methods for NCT', R1-125117, 3GPP TSG RAN WG1 Meeting #71, New Orleans, USA, Nov. 12-16, 2012.
(Continued)

*Primary Examiner* — Mark Rinehart
*Assistant Examiner* — Sanjay K Dewan
(74) *Attorney, Agent, or Firm* — Dentons US LLP

(57) ABSTRACT

Disclosed is a method for transmitting a multicast broadcast single frequency network (MBSFN) subframe, including: configuring, by a base station (BS), at least one subframe, among a plurality of subframes included in a downlink radio frame, to an MBSFN subframe; determining, by the BS, resource allocation with respect to a tracking reference signal in the at least one configured MBSFN subframe based (Continued)

on whether a physical multicast channel is transmitted in the at least one configured MBSFN subframe; and transmitting, by the BS, the tracking reference signal through an MBSFN subframe in which the PMCH is not transmitted among the at least one configured MBSFN subframe.

11 Claims, 20 Drawing Sheets

(51) Int. Cl.
*H04L 1/00* (2006.01)
*H04L 1/16* (2006.01)
*H04L 1/18* (2006.01)
*H04W 72/00* (2009.01)
*H04L 5/00* (2006.01)

(52) U.S. Cl.
CPC .......... *H04L 1/1861* (2013.01); *H04L 5/0092* (2013.01); *H04W 72/042* (2013.01); *H04L 5/001* (2013.01); *H04W 72/005* (2013.01); *H04W 72/0446* (2013.01)

(58) Field of Classification Search
USPC .......................................................... 370/312
See application file for complete search history.

(56) References Cited

U.S. PATENT DOCUMENTS

| | | | | |
|---|---|---|---|---|
| 8,675,537 | B2* | 3/2014 | Khandekar | H04W 72/082 370/312 |
| 8,755,323 | B2* | 6/2014 | Wang | H04W 72/005 370/312 |
| 8,797,939 | B2* | 8/2014 | Ai | H04W 72/005 370/312 |
| 8,811,252 | B2* | 8/2014 | Maeda | H04L 5/0007 370/312 |
| 8,989,174 | B2* | 3/2015 | Montojo | H04W 48/08 370/312 |
| 9,025,520 | B2* | 5/2015 | Kim | H04W 72/005 370/312 |
| 9,320,032 | B2* | 4/2016 | Gaal | H04W 72/042 |
| 9,363,050 | B2* | 6/2016 | Ahn | H04L 5/001 |
| 9,402,253 | B2* | 7/2016 | Yang | H04L 1/0076 |
| 9,414,358 | B2* | 8/2016 | Piggin | H04W 72/005 |
| 9,504,037 | B2* | 11/2016 | Yi | H04B 7/26 |
| 9,526,057 | B2* | 12/2016 | Yi | H04W 36/0055 |
| 2010/0189027 | A1* | 7/2010 | Ishida | H04W 48/12 370/312 |
| 2011/0222457 | A1* | 9/2011 | Lee | H04W 28/06 370/312 |
| 2011/0222507 | A1* | 9/2011 | Lee | H04W 28/26 370/330 |
| 2011/0305184 | A1* | 12/2011 | Hsu | H04L 65/4076 370/312 |
| 2012/0257513 | A1* | 10/2012 | Yamada | H04L 1/0618 370/248 |
| 2012/0263092 | A1* | 10/2012 | Lee | H04W 72/005 370/312 |
| 2012/0281566 | A1* | 11/2012 | Pelletier | H04W 76/046 370/252 |
| 2013/0039250 | A1* | 2/2013 | Hsu | H04H 20/71 370/312 |
| 2013/0308516 | A1* | 11/2013 | Zeng | H04L 5/0098 370/312 |
| 2014/0022975 | A1* | 1/2014 | Chen | H04W 52/0229 370/312 |
| 2014/0226614 | A1* | 8/2014 | Kato | H04W 74/08 370/329 |
| 2015/0139068 | A1* | 5/2015 | Jang | H04W 52/0216 370/312 |
| 2015/0296542 | A1* | 10/2015 | Heo | H04W 74/0833 370/329 |
| 2016/0242153 | A1* | 8/2016 | Chen | H04L 5/0098 |
| 2016/0278073 | A1* | 9/2016 | Dinan | H04W 48/08 |

FOREIGN PATENT DOCUMENTS

| | | |
|---|---|---|
| JP | 2012515494 A | 7/2012 |
| KR | 1020110036513 A | 4/2011 |
| KR | 1020110070768 A | 6/2011 |
| KR | 1020120115947 A | 10/2012 |
| WO | 2010082752 A2 | 7/2010 |
| WO | 2012097689 A1 | 7/2012 |
| WO | 2012110831 A1 | 8/2012 |
| WO | 2012134115 A2 | 10/2012 |

OTHER PUBLICATIONS

NEC Group, 'ePDCCH and PMCH', R1-123254, 3GPP TSG-RAN WG1 #70, Qingdao, China, Aug. 13-17, 2012.
Renesas Mobile Europe Ltd., 'Further Discussions on New Carrier Type in LTE Rel-11 CA', R1-120371, 3GPP TSG RAN WG1 Meeting #68, Dresden, Germany, Feb. 6-10, 2012.
3GPP TS 36.211 V11.1.0, '3GPP; TSGRAN; E-UTRA; Physical Channels and Modulation (Release 11)', Dec. 2012.

\* cited by examiner

FIG. 11
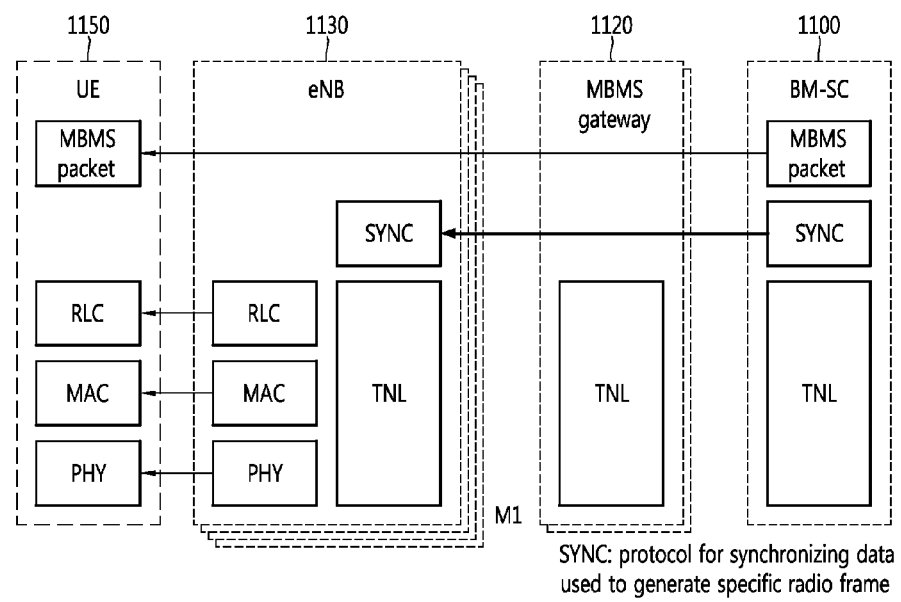
SYNC: protocol for synchronizing data used to generate specific radio frame
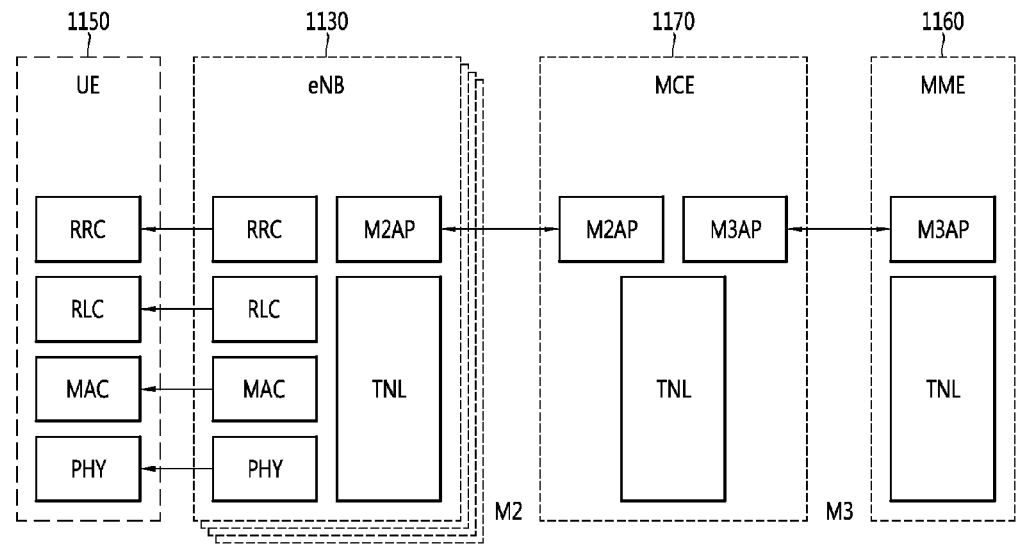

FIG. 15
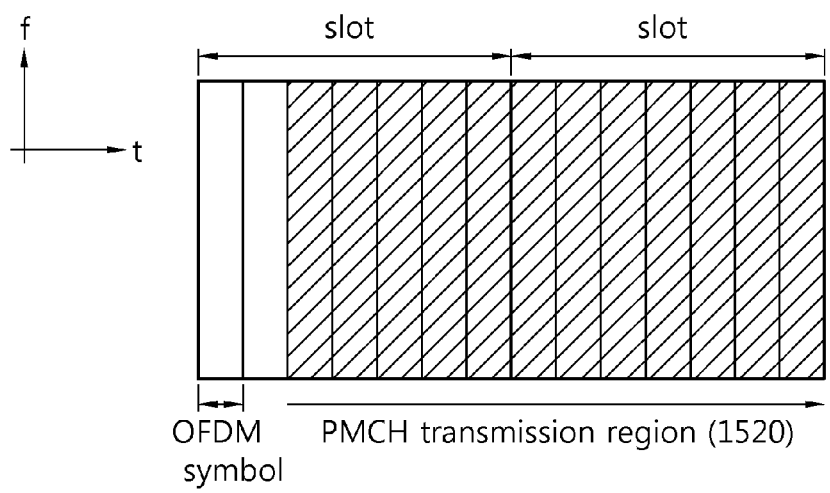
OFDM  PMCH transmission region (1520)
symbol
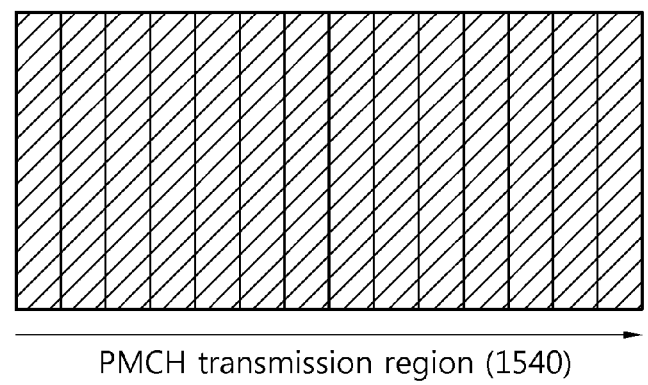
PMCH transmission region (1540)
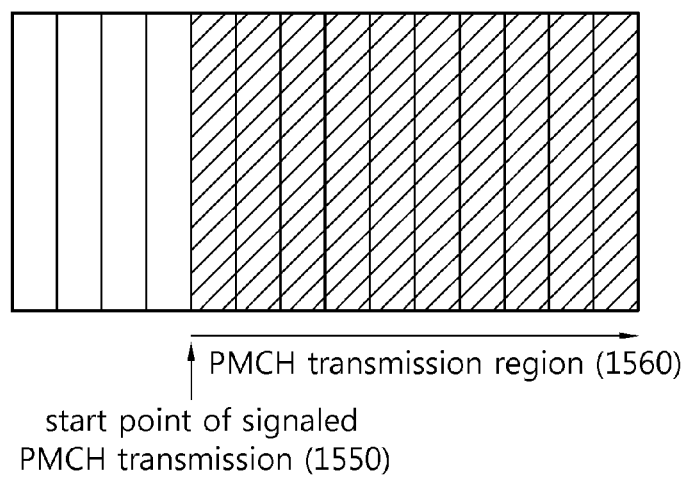
↑ PMCH transmission region (1560)
start point of signaled
PMCH transmission (1550)

FIG. 18

| subframe #0 (1800) | #2 MBSFN | #3 MBSFN | #4 MBSFN | #5 (1850) | #6 MBSFN | #7 MBSFN | #8 MBSFN | #9 MBSFN | #10 MBSFN |

METHOD AND APPARATUS FOR TRANSMITTING AND RECEIVING MBSFN SUBFRAME

This application is a National Stage Application of International Application No. PCT/KR2013/012045, filed Dec. 23, 2013, and claims priority to and the benefit of U.S. Provisional Applications 61/759,416 filed Feb. 1, 2013 and 61/762,326 filed Feb. 8, 2013 the disclosures of which are incorporated by reference herein in their entirety.

BACKGROUND OF THE INVENTION

Field of the Invention

The present invention relates to wireless communication and, more particularly, to a method and apparatus for transmitting and receiving a multicast broadcast single frequency network (MBSFN) subframe.

Related Art

LTE (long term evolution) based on 3GPP 3rd Generation Partnership Project) TS (Technical Specification) Release 8 is a reliable next-generation mobile communication standard.

As presented in 3GPP TS 36.211 V8.7.0 (2009-05) "Evolved Universal Terrestrial Radio Access (E-UTRA); Physical Channels and Modulation (Release 8)", in LTE, a physical channel may be divided into a physical downlink shared channel (PDSCH) and a physical downlink control channel (PDCCH), downlink channels, and a physical uplink shared channel (PUSCH) and a physical uplink control channel (PUCCH), uplink channels.

The PUCCH is an uplink control channel used to transmit uplink control information such as a hybrid automatic repeat request (HARQ) ACK/NACK signal, a channel quality indicator (CQI), or a scheduling request (SR).

Meanwhile, 3GPP LTE-A (Advanced), the advancement of 3GPP LTE, is in progress. 3GPP LTE-A adopts carrier aggregation (CA) and multi-input multi-output (MIMO) supporting four or more antenna ports.

Carrier aggregation (CA) uses multiple component carriers (CCs). A CC is defined by a central frequency and a bandwidth. A single downlink CC or a pair of an uplink CC and a downlink CC correspond to a single cell. A user equipment (UE) served with multiple downlink CCs may be considered to be served by multiple serving cells.

A time division duplex (TDD) system uses the same frequency in downlink and uplink. Thus, one or more downlink subframes are associated to an uplink subframe. Here, 'association' refers to transmission and reception in a downlink subframe is associated with transmission and reception in an uplink subframe. For example, when a transport block is received in a plurality of downlink subframes, a UE transmits an HARQ ACK/NACK for the transport block in an uplink subframe associated to the plurality of downlink subframes.

SUMMARY OF THE INVENTION

An object of the present invention provides a method for transmitting and receiving a multicast broadcast single frequency network (MBSFN) subframe.

An object of the present invention provides an apparatus for transmitting and receiving an MBSFN subframe.

According to an aspect of the present invention, there is provided a method for transmitting a multicast broadcast single frequency network (MBSFN) subframe, including: configuring, by a base station (BS), at least one subframe, among a plurality of subframes included in a downlink radio frame, to an MBSFN subframe; determining, by the BS, resource allocation with respect to a tracking reference signal in the at least one configured MBSFN subframe based on whether a physical multicast channel is transmitted in the at least one configured MBSFN subframe; and transmitting, by the BS, the tracking reference signal through an MBSFN subframe in which the PMCH is not transmitted among the at least one configured MBSFN subframe, wherein the tracking reference signal is a reference signal used for time and frequency tracking of a UE and is generated based on a reference signal sequence determined by a pseudo-random sequence initialized with $c_{init}=2^{10} \cdot (7 \cdot (n_s+1)+l+1) \cdot (2 \cdot N_{ID}^{cell}+1)+2 \cdot N_{ID}^{cell}+N_{CP}$, where ns is a slot number in the radio frame, I is an orthogonal frequency division multiplexing (OFDM) symbol index of a slot, $N_{ID}^{cell}$ is a physical cell identifier (PCI) of a cell, $N_{CP}$ is set to 1 in case of a normal cyclic prefix (CP) and 0 in case of an extended CP.

According to another aspect of the present invention, there is provided a base station (BS) of a wireless communication system, including: a radio frequency (RF) unit configured to receive a radio signal; and a processor selectively connected to the RF unit, wherein the processor is implemented to configure at least one subframe, among a plurality of subframes included in a downlink radio frame, to an MBSFN subframe; determine resource allocation with respect to a tracking reference signal in the at least one configured MBSFN subframe based on whether a physical multicast channel is transmitted in the at least one configured MBSFN subframe, and transmit the tracking reference signal through an MBSFN subframe in which the PMCH is not transmitted among the at least one configured MBSFN subframe, wherein the tracking reference signal is a reference signal used for time and frequency tracking of a UE and is generated based on a reference signal sequence determined by a pseudo-random sequence initialized with $c_{init}=2^{10} \cdot (7 \cdot (n_s+1)+l+1) \cdot (2 \cdot N_{ID}^{cell}+1)+2 \cdot N_{ID}^{cell}+N_{CP}$, where ns is a slot number in the radio frame, I is an orthogonal frequency division multiplexing (OFDM) symbol index of a slot, $N_{ID}^{cell}$ is a physical cell identifier (PCI) of a cell, $N_{CP}$ is set to 1 in case of a normal cyclic prefix (CP) and 0 in case of an extended CP.

According to embodiments of the present invention, a multimedia broadcast multicast service (MBMS) may be effectively provided to a UE. Also, the UE may effectively perform frequency and time unit tracking on downlink data transmitted from a base station (BS) through a reference signal transmitted via a multicast broadcast single frequency network (MBSFN) subframe.

BRIEF DESCRIPTION OF THE DRAWINGS

FIG. 11 is a conceptual view illustrating a protocol for supporting a multimedia broadcast multicast service (MBMS).

FIG. 15 is a conceptual view illustrating an NCT subframe set as an MBSFN subframe according to an embodiment of the present invention.

FIG. 18 is a conceptual view illustrating a method for transmitting an NCT-CRS in an NCT subframe set as an MBSFN subframe according to an embodiment of the present invention.

DESCRIPTION OF EXEMPLARY EMBODIMENTS

A user equipment (UE) may be fixed or mobile, and may be called by other names such as mobile station (MS), mobile terminal (MT), user terminal (UT), subscriber station (SS), wireless device, personal digital assistant (PDA), wireless modem, handheld device, or the like.

A base station (BS) generally refers to a fixed station communicating with a UE and may be called by other names such as evolved-NodeB (eNB), base transceiver system (BTS), access point (AP), or the like.

Figure 1:
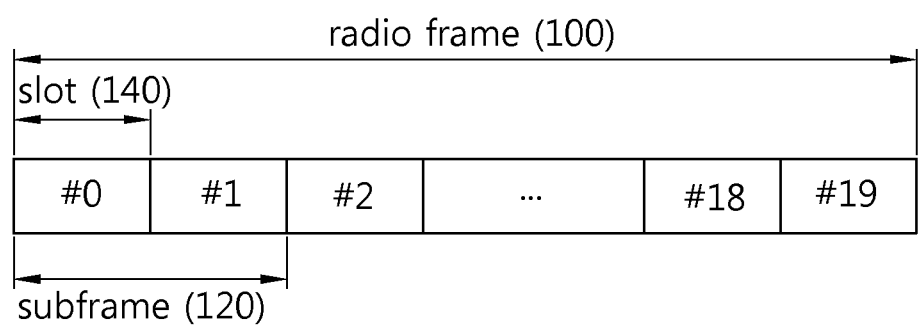
FIG. 1 is view illustrating a structure of a radio frame in LTE.

FIG. 1 illustrates a structure of a radio frame in LTE.

In 3GPP LTE, a structure of a radio frame 100 is presented in Paragraph 5 of 3GPP TS 36.211 V8.2.0 (2008-03) "Technical Specification Group Radio Access Network; Evolved Universal Terrestrial Radio Access (E-UTRA); Physical channels and modulation (Release 8)".

Referring to FIG. 1, a radio frame 100 is composed of ten subframes 120, and a single subframe 120 is composed of two slots 140. The radio frame 100 may be indexed based on the slots 140 from slot #0 to slot #19 or may be indexed based on subframes from subframe #0 to subframe #9 according to the subframes 120. For example, subframe #0 may include slot #0 and slot #1.

A time taken for one subframe to be transmitted is called a TTI (transmission time interval). A TTI may be a scheduling unit for data transmission. For example, a length of one radio frame 100 may be 10 ms, a length of one subframe may be 1 ms, and a length of one slot may be 0.5 ms.

One slot 140 includes a plurality of orthogonal frequency division multiplexing (OFDM) symbols in a time domain and a plurality of subcarriers in a frequency domain. In LTE, a BS uses OFDMA as an accessing method in a downlink channel. OFDM symbols are used to express a symbol period. The OFDM symbols may be called by other names depending on a multiple-access scheme. For example, in an uplink channel in which a UE transmits data to a BS, a single carrier frequency division multiple access (SC-FDMA) may be used as a multi-access scheme. A symbol period during which data is transmitted in an uplink channel may be called SC-FDMA symbols.

The structure of the radio frame 100 illustrated in FIG. 1 may be an embodiment of a frame structure. Thus, the number of subframes 120 included in the radio frame 100, the number of slots 140 included in the subframe 120, or the number of OFDM symbols included in the slots 140 may be varied to define a new radio frame format.

In a structure of a radio frame, a number of symbols included in a single slot may vary depending on which cyclic prefix (CP) a radio frame uses. For example, in a case in which a radio frame uses a normal CP, a single slot may include seven OFDM symbols. In a case in which a radio frame uses an extended CP, a single slot may include six OFDM symbols.

A wireless communication system may use a frequency division duplex (FDD) scheme, a time division duplex (TDD) scheme, or the like, as a duplexing scheme. According to the FDD scheme, uplink transmission and downlink transmission may be performed based on different frequency bands. According to the TDD scheme, uplink transmission and downlink transmission may be performed using a time division scheme based on the same frequency band. Since the same frequency band is used, channel responses of the TDD scheme may be reciprocal. Namely, in the TDD scheme, a downlink channel response and an uplink channel response may be almost identical in a given frequency domain. Thus, in the TDD-based wireless communication system, channel state information of a downlink channel may be obtained from channel state information of an uplink channel. Since the TDD scheme time-divides the entire frequency band for uplink transmission and downlink transmission, downlink transmit by a BS and uplink transmission by a UE may be simultaneously performed.

Figure 2:
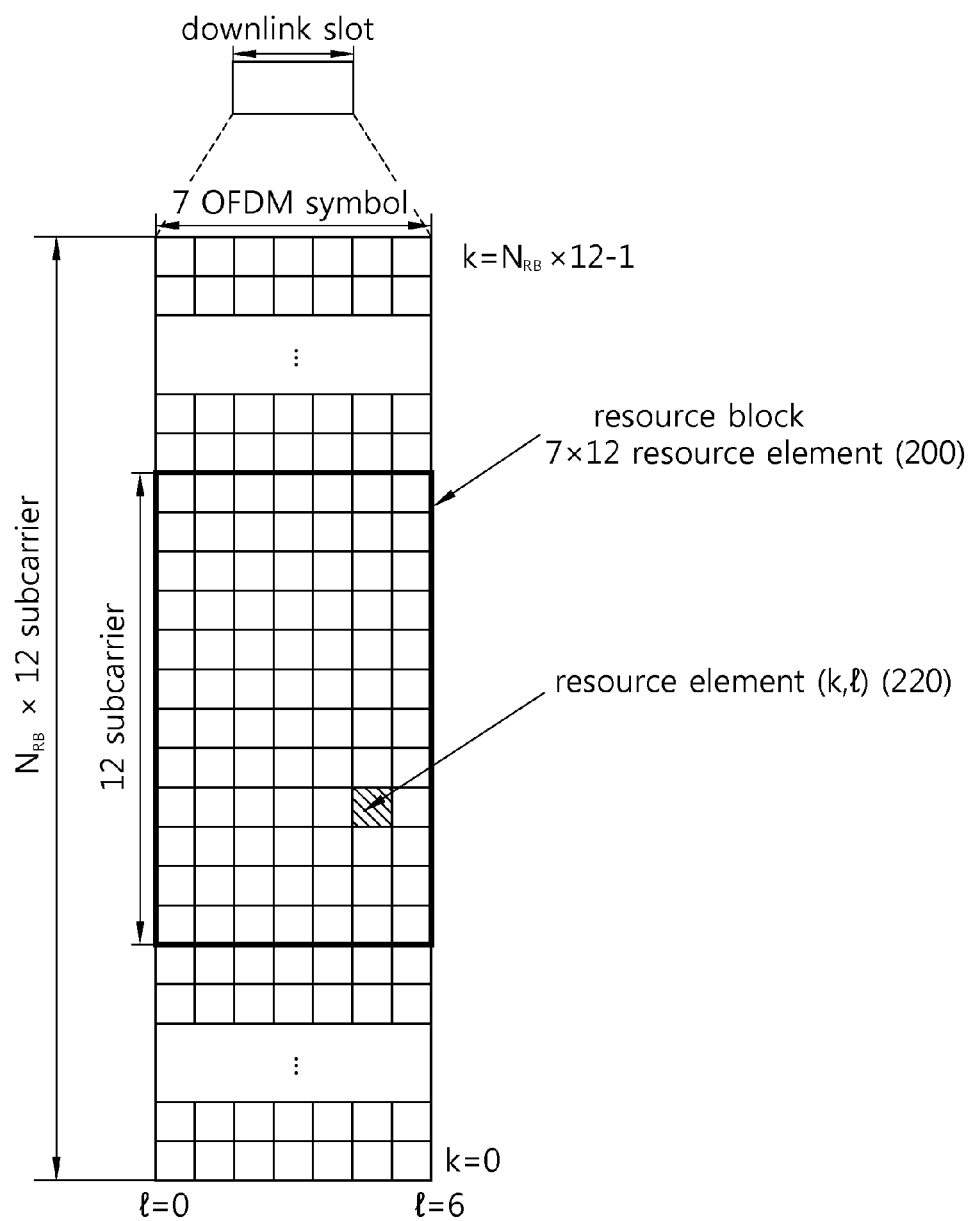
FIG. 2 is a view illustrating an example of a resource grid of a downlink slot.

FIG. 2 illustrates an example of a resource grid of a downlink slot.

A downlink slot includes a plurality of OFDM symbols in a time domain and includes NRB number of resource blocks in a frequency domain. The number NRB of resource blocks included in a downlink slot may be determined according to a downlink transmission bandwidth. For example, the number NRB may be a value of any one of 6 to 110 according to a transmission bandwidth in use. A single resource block 200 may include a plurality of subcarriers in the frequency domain. A structure of an uplink slot may be identical to that of the downlink slot.

Each element of a resource grid is called a resource element. A resource element 220 of the resource grid may be identified by (k, l) as an index pair. Here, k (k=0, . . . , NRBx12−1) is an index of a subcarrier in the frequency domain, and l (l=0, . . . , 6) is an index of an OFDM symbol in the time domain.

Here, the single resource block 200 may include 7×12 number of resource elements 220 composed of seven OFDM symbols in the time domain and twelve subcarriers in the frequency domain. This size is merely an example, the number of OFDM symbols and the number of subcarriers constituting the single resource block 200 may vary. A resource block pair indicates a resource unit including two resource blocks.

The number of OFDM symbols included in a single slot may have a value different according to a CP as mentioned above. Also, the number of resource blocks included in a single slot may vary according to a size of an overall frequency bandwidth.

Figure 3:
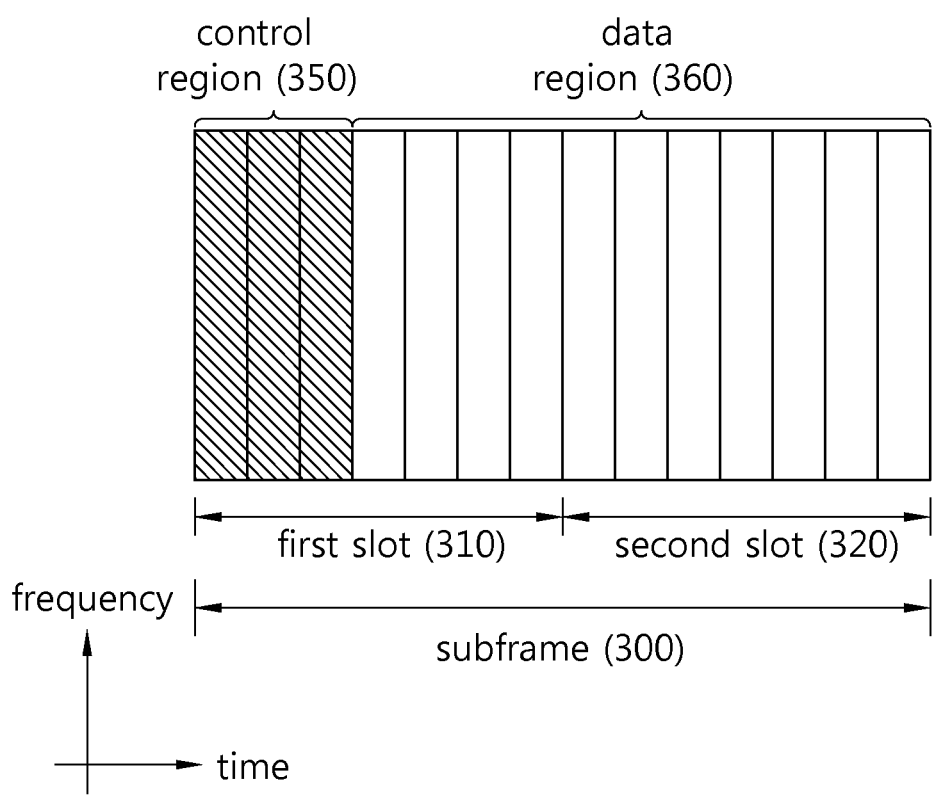
FIG. 3 is a view illustrating a structure of a downlink subframe.

FIG. 3 is a view illustrating a structure of a downlink subframe.

A downlink subframe 300 may be divided into two slots 310 and 320 based on time. Each of the slots 310 and 320 includes seven OFDM symbols in a normal CP. A resource region corresponding to three OFDM symbols (a maximum of four OFDM symbols with respect to 1.4 MHz bandwidth) ahead over time included in the first slot 310 may be used as a control region to which control channels are allocated. The other remaining OFDM symbols may be used as a data region 360 to which a traffic channel such as a physical downlink shared channel (PDSCH) is allocated.

A PDCCH may be a control channel transmitting resource allocation and transmission format of a downlink-shared channel (DL-SCH), resource allocation information of an uplink shared channel (UL-SCH), paging information on a PCH, system information on a DL-SCH, resource allocation with respect to a higher layer control message such as a random access response transmitted on a PDSCH, an aggregation of transmission power control command with respect to individual UEs of a certain UE group, activation information of voice over Internet protocol (VoIP), and the like. A plurality of units transmitting PDCCH data may be defined in the control region 350. A UE may obtain control data by monitoring a plurality of units transmitting PDCCH data. For example, PDCCH data may be transmitted to a UE based on a single CCE or an aggregation of some contiguous control channel elements (CCE). The CCE may be a single unit transmitting PDCCH data. The CCE may include a plurality of resource element groups. A resource element group is a resource unit including four available resource elements.

A base station (BS) may determine a PDCCH format according to downlink control information (DCI) to be sent to a UE, and attaches cyclic redundancy check (CRC) to the control information. A unique identifier (radio network temporary identifier (RNTI) is masked to the CRC according to an owner or purpose of the PDCCH. In case of a PDCCH for a particular UE, a UE-specific identifier, for example, a cell-RNTI (C-RNTI), may be masked to the CRC. Alternatively, in case of PDCCH for a paging message, a paging indication identifier, for example, a paging-RNTI (P-RNTI), may be masked to the CRC. In case of a PDCCH for a system information block (SIB), a system information identifier (a system information block (SIB)) may be masked to the CRC. In order to indicate a random access response, a response with respect to a transmission of a random access preamble, a random access-RNTI (RA-RNTI) may be masked to the CRC.

Figure 4:
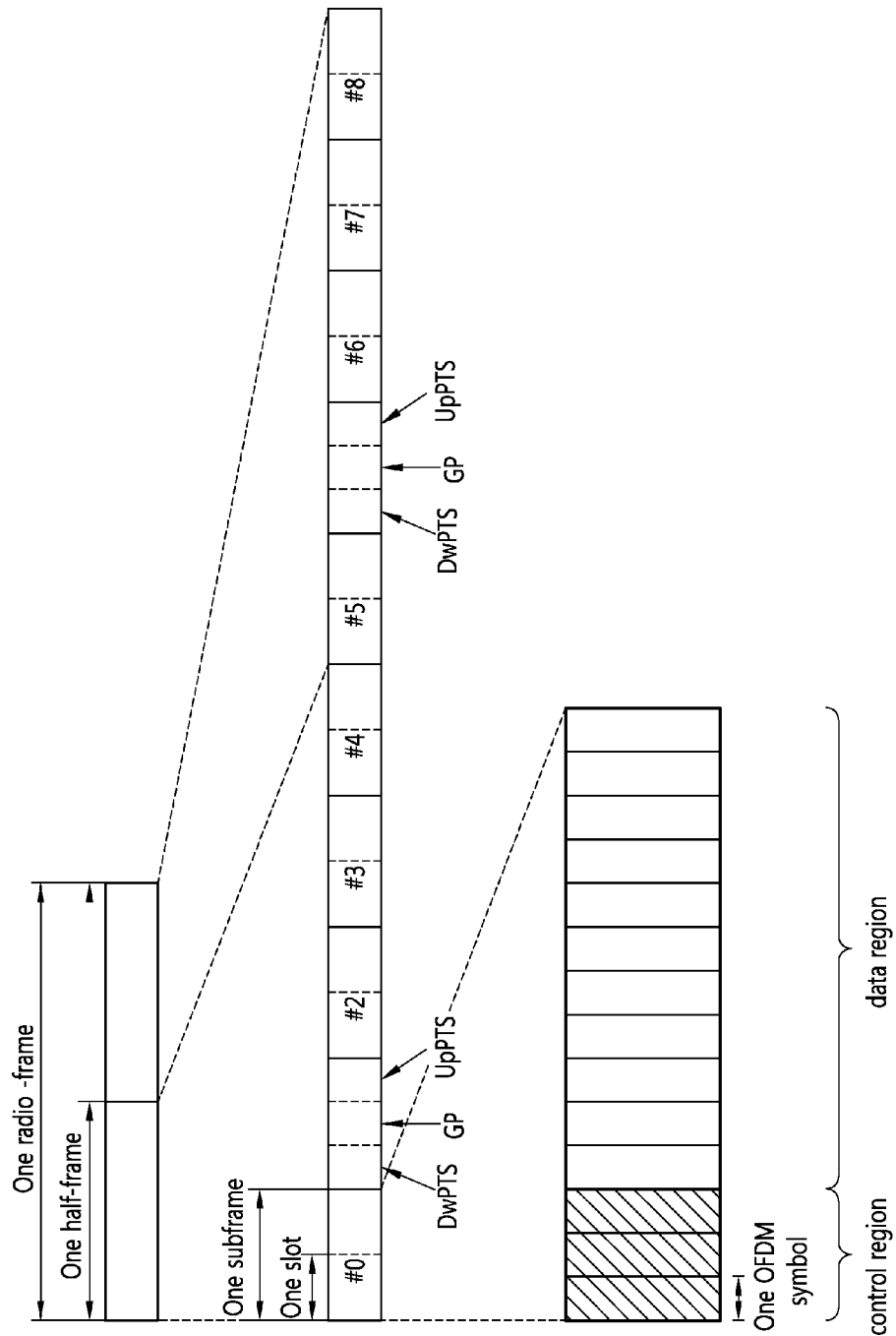
FIG. 4 is a view illustrating a structure of a downlink radio frame in a TDD mode in 3GPP LTE.

FIG. 4 is a view illustrating a structure of a downlink radio frame in a TDD mode in 3GPP LTE.

A structure of a downlink radio frame in a time index duplex (TDD) mode may be referred to Paragraph 4 of 3GPP TS 36.211 V8.7.0 (2009-05) "Evolved Universal Terrestrial Radio Access (E-UTRA); Physical Channels and Modulation (Release 8)", and serves for TDD.

Subframes having index #1 and index #6 are called special subframes which include downlink pilot time slot (DwPTS), guard period (GP), and an uplink pilot time slot (UpPTS). The DwPTS is used for initial cell search, synchronization, or channel estimation in a UE. The UpPTS is used for channel estimation and matching uplink transmission synchronization in a BS. The GP is a period for canceling interference caused in uplink due to a multi-path delay of a downlink signal between uplink and downlink.

In TDD, a DL subframe and a UL subframe coexist in a single radio frame. Table 1 shows an example of a configuration of a radio frame.

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

"D" is a DL subframe, "U" is a UL subframe, and "S" is a spatial subframe. When a UL-DL configuration is received from a BS, a UE recognize which subframe is a DL subframe or a UL subframe according to a configuration of a radio frame.

A PCFICH transmitted in a first OFDM symbol of a subframe carries a control format indicator (CFI) regarding a number of OFDM symbol (namely, a size of a control region0 used for transmission of control channels in the subframe. The UE may first receives the CFI on the PCFICH, and subsequently monitor a PDCCH.

Figure 5:
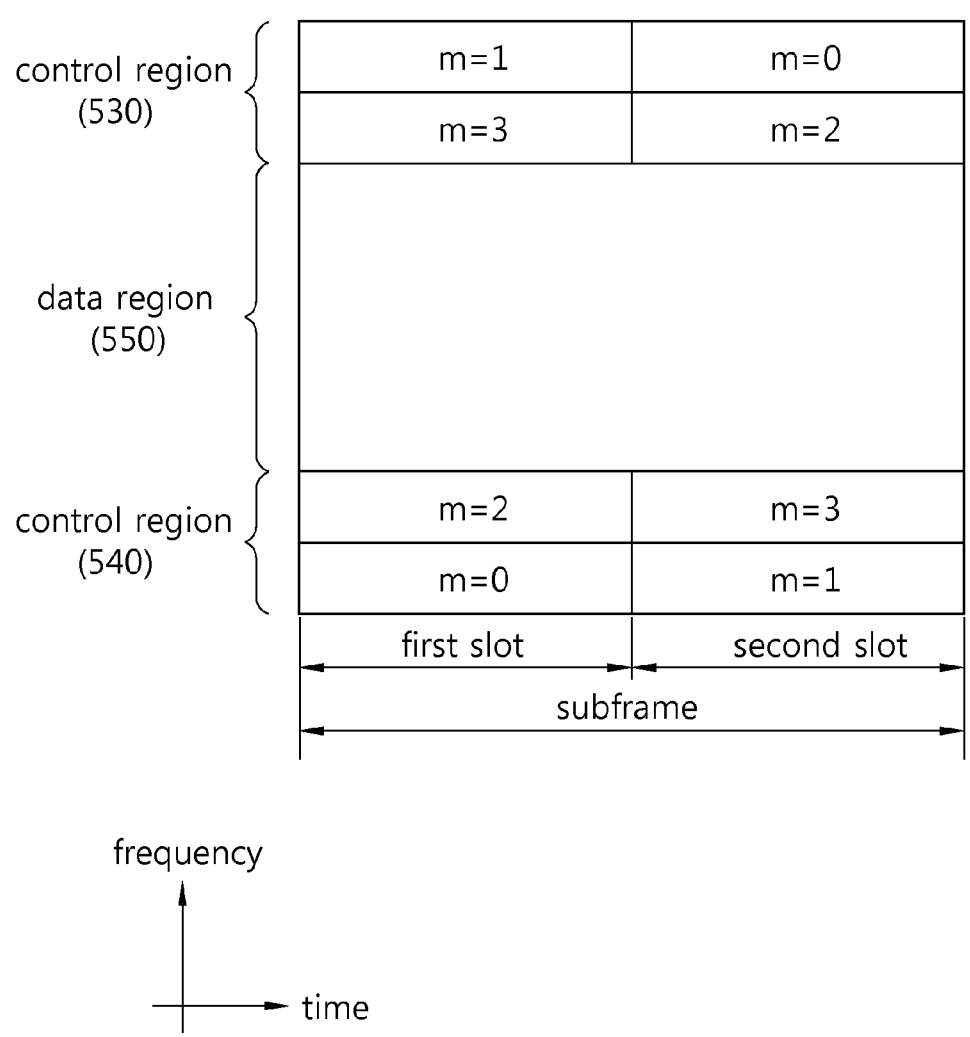
FIG. 5 is a view illustrating a structure of an uplink subframe in 3GPP LTE.

FIG. 5 is a view illustrating a structure of an uplink subframe in 3GPP LTE.

An uplink subframe may be divided into a control region to which a physical uplink control channel (PUCCH) carrying uplink control information in the frequency domain is allocated and a data region to which a physical uplink shared channel (PUSCH) carrying user data. Resource allocation with respect to the PUCCH may be positioned in the edge of a bandwidth of a component carrier (CC).

The PUCCH may be allocated based on an RB pair in a subframe. RBs belonging to an RB pair may be allocated to different subcarriers in each of a first slot and a second block. m is a position index indicating a logical frequency domain positi9no of an RB pair allocated to the PUCCH within a subframe. It can be seen tat RBs having the same m value are allocated to different subcarriers of the first slot and the second slot.

According to 3GPP TS 36.211 V8.7.0, the PUCCH may have various formats. PUCCHs of different formats having different numbers of bits may be used in subframes according to modulation schemes used for PUCCH formats.

Table 2 shows an example of modulation schemes and numbers of bits per subframe according to PUCCH formats.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK-BPSK | 21 |
| 2b | QPSK-QPSK | 22 |
| 3 | QPSK | 48 |

PUCCH format 1 is used for transmission of a scheduling request (SR). PUCCH formats 1a and 1b are used for transmission of an ACK/NACK signal for HARQ. PUCCH format 2 is used for transmission of a CQI. PUCCH formats 2a and 2b are used for simultaneous transmission of CQI and ACK/NACK signal. When only an ACK/NACK signal is transmitted in a subframe, the PUCCH formats 1a and 1b are used, and when an SR is transmitted alone, the PUCCH format 1 is used. When SR and ACK/NACK are simultaneously transmitted, the PUCCH format 1 is used, and ACK/NACK signals are modulated and transmitted in resource allocated to SR.

All the PUCCH formats use a cyclic shift (CS) of a sequence in each OFDM symbol. A cyclic-shifted sequence is generated by cyclic-shifting a base sequence by a particular cyclic shift amount. The particular CS amount is indicated by a CS index.

A length of a sequence is equal to a number of elements included in the sequence. A sequence index for indicating a sequence may be determined based on a cell identifier, a slot number within a radio frame, and the like. When it is assumed that a base sequence is mapped to a single resource block in the frequency domain, since a single resource block includes twelve subcarriers, a length N of the base sequence may be 12. The base sequence may be cyclic-shifted to generate a cyclic-shifted sequence.

An available cyclic-shift index of the base sequence may be induced from the base sequence according to a CS interval. For example, when a length of the base sequence is 12 and a CS interval is 1, available cyclic shift indices of the base sequence totals 12. Also, when a length of the base sequence is 12 and a CS interval is 2, available cyclic shift indices of the base sequence totals 6. Hereinafter, transmission of an HARQ ACK/NACK signal in the PUCCH format 1b will be described.

Figure 6:
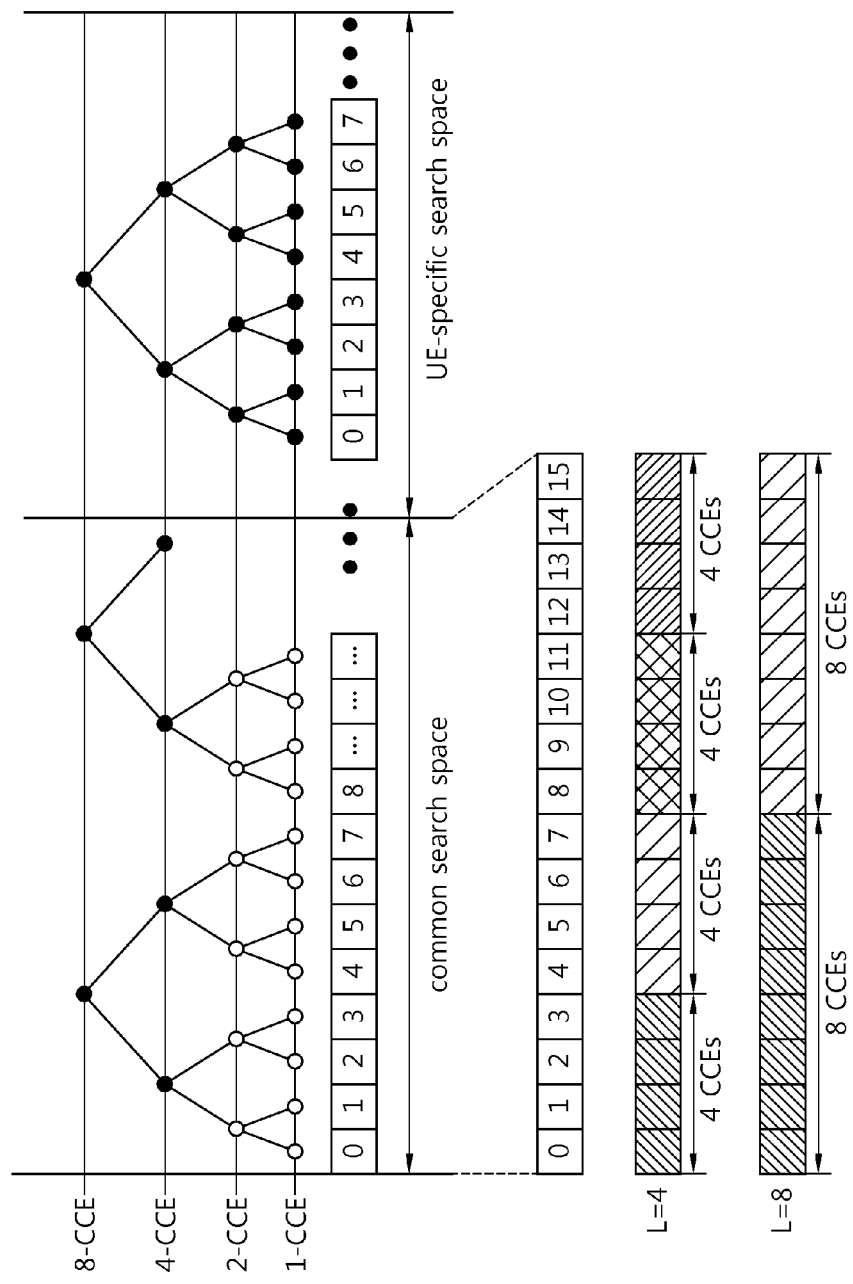
FIG. 6 is a view illustrating monitoring of a PDCCH.

FIG. 6 is a view illustrating monitoring of a PDCCH.

A monitoring procedure of a PDCCH may refer to Paragraph 9 of 3GPP TS 36.213 V10.2.0 (2011-06).

A UE may perform blind decoding to detect a PDCCH. Blind decoding is demasking a CRC of received PDDCH (referred to as a 'PDCCH candidate') data based on a particular identifier and subsequently checks a CRC error to ascertain whether the corresponding PDCCH is a control channel of the UE. The UE does not know in which position of the control region its PDCCH data is transmitted or at which CCE aggregation level and in which DCI format its PDCCH data is transmitted.

A plurality of PDCCHs may be transmitted in a single subframe. A UE monitors a plurality of PDCCHs in every subframe. Here, monitoring refers to attempting to perform blind decoding on a PDCCH by a UE.

In 3GPP LTE, in order to reduce a burden of performing blind decoding of a UE, a search space is used. The search space may be a monitoring set of CCEs to search for a PDCCH. The UE may monitor PDCCHs based on the search space.

The search space is divided into a common search space and a UE-specific search space. The common search space, a space for searching for a PDCCH having common control information, is composed of sixteen CCEs from CCE index 0 to 15 and supports a PDCCH having a CCE aggregation level of {4, 8}. However, even in the common search space, PDCCH data (DCI formats 0 and 1A) carrying UE-specific information may also be transmitted in the common search space. The UE-specific search space supports a PDCCH having a CCE aggregation level of {1, 2, 4, 8}.

Table 11 shows number of PDCCH candidates monitored by a UE.

TABLE 3

| search space $S_k^{(L)}$ | | | Number | |
|---|---|---|---|---|
| Type | Aggregation level(L) | Size[in CCEs] | of PDCCH candidates $M^{(L)}$ | DCI format |
| UE-specific | 1 | 6 | 6 | 0, 1, 1A, 1B, |
| | 2 | 12 | 6 | 1D, 2, 2A |
| | 4 | 8 | 2 | |
| | 8 | 16 | 2 | |
| Common | 4 | 16 | 4 | 0, 1A, 1C, 3/3A |
| | 8 | 16 | 2 | |

Sizes of search spaces are determined as shown in Table 11, and start points of search spaces are differently defined in common search spaces and UE-specific search spaces. Start points of the common search spaces are fixed regardless of a subframe, while start points of UE-specific search spaces may vary for each subframe according to a UE identifier (for example, a C-RNTI), a CCE aggregation level and/or a slot number within a radio frame. In a case in which a start point of a UE-specific search space is within a common search space, the UE-specific search space and the common search space may overlap.

An aggregation of PDCCH candidates monitored by a UE may be defined based on a search space. A search space $S_k^{(L)}$ is defined by an aggregation of PDCCH candidates in an agregation level 1, 2, 4, or 8. Ini the search space $S_k^{(L)}$, a CCE corresponding to a PDCCH candidate m is given as shown in Equation 1 below.

$$L \cdot \{(Y_k + m') \bmod \lfloor N_{CCE,k}/L \rfloor\} + i \qquad \text{<Equation 1>}$$

Here, i=0, . . . L−1. In a case in which a search space is a common search space, m'=m. In a case in which a search space is a UE-specific search space, when a carrier indicator field is set for a UE, m'=m+$M^{(L)} \cdot n_{CI}$, and here, nCI is a set value of CIF. When a CIF is not set for a UE, m'=m. Here, m=0, . . . , $M^{(L)}$−1 where $M^{(L)}$) is a number of PDCCH candidates for monitoring a given search space.

In the common search space, Yk is set to 0 with respect to two aggregation levels L=4 and L=8. The variable Yk in a UE-specific search space of the aggregation level L is defined as expressed by Equation 2 below.

$$Y_k = (A \cdot Y_{k-1}) \bmod D \qquad \text{<Equation 2>}$$

Here, $Y_{-1} = n_{RNTI} \neq 0$. A=39827, D=65537, k=$\lfloor n_s/2 \rfloor$ where Ns is a slot number within a radio frame.

When a wireless device monitors a PDCCH based on a C-RNTI, a DCI format and a search space to be monitored are determined according to a transmission mode of a PDSCH. Table 4 shows an example of PDCCH monitoring with a C-RNTI set.

TABLE 4

| Transmission mode | DCI format | Search space | Transmission mode of PDSCH according to PDCCH |
|---|---|---|---|
| Mode 1 | DCI format 1A | Common and UE-specific | Single antenna port, port 0 |
| | DCI format 1 | UE-specific | Single antenna port, port 0 |
| Mode 2 | DCI format 1A | Common and UE-specific | Transmit diversity |
| | DCI format 1 | UE-specific | Transmit diversity |
| Mode 3 | DCI format 1A | Common and UE-specific | Transmit diversity |
| | DCI format 2A | UE-specific | Cyclic delay diversity (CDD) or transmit diversity |
| Mode 4 | DCI format 1A | Common and UE-specific | Transmit diversity |
| | DCI format 2 | UE-specific | Closed-loop spatial multiplexing |
| Mode 5 | DCI format 1A | Common and UE-specific | Transmit diversity |
| | DCI format 1D | UE-specific | Multi-user multiple input multiple output (MU-MIMO) |
| Mode 6 | DCI format 1A | Common and UE-specific | Transmit diversity |
| | DCI format 1B | UE-specific | Closed-loop spatial multiplexing |
| Mode 7 | DCI format 1A | Common and UE-specific | When number of PBCH transmission ports is 1, single antenna port, port 0, or otherwise, transmit diversity |
| | DCI format 1 | UE-specific | Single antenna port, port 0 |
| Mode 8 | DCI format 1A | Common and UE-specific | When number of PBCH transmission ports is 1, single antenna port, port 0, or otherwise, transmit diversity |
| | DCI format 2B | UE-specific | Dual-layer transmission (port 7 or 8), or single antenna port, port 7 or 8 |

Purposes of DCI formats are discriminated as follows.

TABLE 5

| DCI format | Contents |
|---|---|
| DCI format 0 | Used for PUSCH scheduling |
| DCI format 1 | Used for scheduling of single PDSCH codeword |
| DCI format 1A | Used for compact scheduling of single PDSCH codeword and random access process |
| DCI format 1B | Used for compact scheduling of single PDSCH codeword having precoding information |
| DCI format 1C | Used for very compact scheduling of single PDSCH codeword |
| DCI format 1D | Used for compact scheduling of single PDSCH codeword having precoding and power offset information |
| DCI format 2 | Used for PDSCH scheduling of UEs set to closed-loop spatial multiplexing mode |
| DCI format 2A | Used for PDSCH scheduling of UEs set to open-loop spatial multiplexing mode |
| DCI format 3 | Used for transmitting of TPC command of PUCCH and PUSCH having 2-bit power adjustments |
| DCI format 3A | Used for transmitting of TPC command of PUCCH and PUSCH having 1-bit power adjustment |

DCI formats and search spaces to be used may be determined differently according to an RNTI masked to the CRC used to generate DCIs. Table 6 shows search spaces of control channels and DCI formats used when an SI-RNTI, a P-RNTI, or an RA-RNTI are masked to CRCs of DCIs.

TABLE 6

| DCI format | Search space | Transmission mode of PDSCH according to PDCCH |
|---|---|---|
| DCI format 1C | Common | When number of PBCH transmission ports is 1, single antenna port, port 0, or otherwise, transmit diversity |
| DCI format 1A | Common | When number of PBCH transmission ports is 1, single antenna port, port 0, or otherwise, transmit diversity |

Table 7 shows search spaces and DCI formats of control channels used when SPS-C-RNT is masked to CRCs of DCIs.

TABLE 7

| Transmission mode | DCI format | Search space | Transmission mode of PDSCH according to PDCCH |
|---|---|---|---|
| Mode 1 | DCI format 1A | Common and UE-specific | Single antenna port, port 0 |
| | DCI format 1 | UE-specific | Single antenna port, port 0 |
| Mode 2 | DCI format 1A | Common and UE-specific | Transmit diversity |
| | DCI format 1 | UE-specific | Transmit diversity |
| Mode 3 | DCI format 1A | Common and UE-specific | Transmit diversity |
| | DCI format 2A | UE-specific | Transmit diversity |
| Mode 4 | DCI format 1A | Common and UE-specific | Transmit diversity |
| | DCI format 2 | UE-specific | Transmit diversity |
| Mode 5 | DCI format 1A | Common and UE-specific | Transmit diversity |
| Mode 6 | DCI format 1A | Common and UE-specific | Transmit diversity |
| Mode 7 | DCI format 1A | Common and UE-specific | Single antenna port, port 5 |
| | DCI format 1 | UE-specific | Single antenna port, port 5 |
| Mode 8 | DCI format 1A | Common and UE-specific | Single antenna port, port 7 |
| | DCI format 2B | UE-specific | Single antenna port, port 7 or 8 |
| Mode 9 | DCI format 1A | Common and UE-specific | Single antenna port, port 7 |
| | DCI format 2C | UE-specific | Single antenna port, port 7 or 8 |
| Mode 10 | DCI format 1A | Common and UE-specific | Single antenna port, port 7 |
| | DCI format 2D | UE-specific | Single antenna port, port 7 or 8 |

Table 8 shows search spaces and DCI formats of control channels used when a temporary C-RNTI is masked to CRCs of DCIs.

TABLE 8

| DCI format | Search space | Transmission mode of PDSCH according to PDCCH |
|---|---|---|
| DCI format 1A | Common and UE-specific | When number of PBCH transmission ports is 1, single antenna port, port 0, or otherwise, transmit diversity |
| DCI format 1 | UE-specific | When number of PBCH transmission ports is 1, single antenna port, port 0, or otherwise, transmit diversity |

Figure 7:
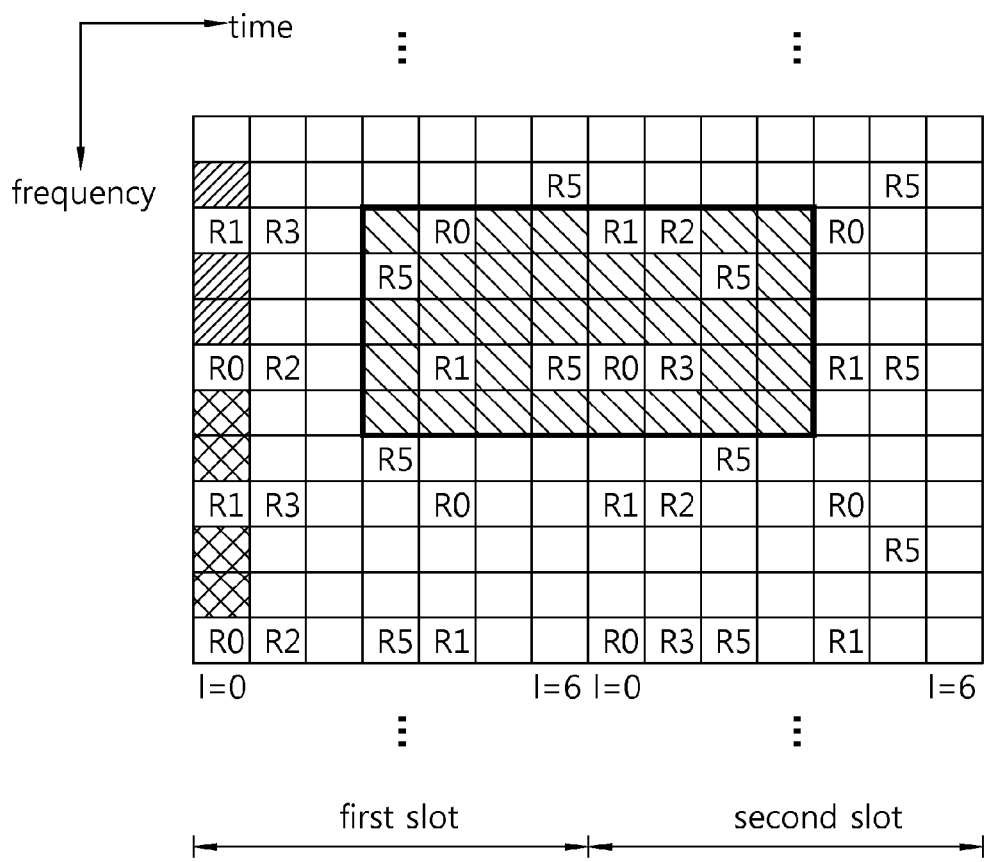
FIG. 7 is a view illustrating a downlink subframe including reference signals and control channels of 3GPP LTE allocated thereto.

FIG. 7 is a view illustrating a downlink subframe including reference signals and control channels of 3GPP LTE allocated thereto.

A downlink subframe may be divided into a control region and a data region. For example, the control region of the downlink subframe includes first three OFDM symbols and the data region in which the PDSCH is transmitted includes the other remaining OFDM symbols.

In the control region, a physical control format indicator channel (PCFICH), a physical HARQ ACK/NACK indicator channel (PHICH), and/or PDCCH are transmitted.

The PHICH may transmit hybrid automatic retransmission request (HARQ) information in response to an uplink transmission.

The PCFICH may transmit information regarding the number of OFDM symbols allocated to the PDCCH. For example, a control format indicator (CFI) of the PCFICH may indicate three OFDM symbols. In the control region, a region excluding resource in which the PCFICH and/or the PHICH are transmitted is a PDCCH region in which a UE monitors a PDCCH.

Also, various reference signals may be transmitted in the subframe.

A cell-specific reference signal (CRS) is a reference signal that may be received by all the UEs within a cell. The CRS may be transmitted throughout the entire downlink frequency band. In FIG. 7, "R0" is an RE in which a CRS with respect to a first antenna port is transmitted, "R1" is an RE in which a CRS with respect to a second antenna port is transmitted, "R2" is an RE in which a CRS with respect to a third antenna port is transmitted, and "R3" is an RE in which a CRS with respect to a fourth antenna port is transmitted.

RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{⟨Equation 3⟩}$$

Here, m=0, 1, . . . , $2N_{RB}^{max,DL}-1$, $N_{RB}^{max,DL}$ is a maximum number of RBs, ns is a slot number within a radio frame, and l is an OFDM symbol index within a slot.

A pseudo-random sequence c(i) is defined by a gold sequence having a length 31 as follows.

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$    <Equation 4>

Here, Nc=1600, a first m-sequence is initialized with x1(0)=1, x1(n)=0, m=1, 2, . . . , 30. A second m-sequence is initialized with $c_{init}=2^{10}\cdot(7\cdot(n_s+1)+l+1)\cdot(2\cdot N_{ID}^{cell}+1)+2\cdot N_{ID}^{cell}+N_{CP}$ at the beginning of each OFDM symbol. $N_{ID}^{cell}$ is a physical cell identifier of a cell. In case of a normal CP, $N_{CP}=1$, and in case of an extended CP, $N_{CP}=0$.

Also, a UE-specific reference signal (URS) may be transmitted in a subframe. A CRS is transmitted in the entire region of a subframe, while a URS is transmitted in a data region of a subframe. The URS is a reference signal used for demodulating a PDSCH. In FIG. 7, "R5" is an RE in which a URS is transmitted. A DM-RS is a reference signal for demodulating EPDCCH data.

A URS may be transmitted in an RB to which resource of corresponding PDSCH data is mapped. In FIG. 7, R5 is shown in addition to regions in which PDSCH data is transmitted, which is to indicate a position f an RE to which the URS is mapped.

The URS may be a reference signal demodulated only by a particular UE. An RS sequence $r_{l,ns}(m)$ for a URS is the same as that of Equation 3. In this case, m=0, 1, . . . , $12N_{RB}^{PDSCH}-1$ and $N_{RB}^{PDSCH}$ is the number of RBs. In a case in which a URS is transmitted via a single antenna, a pseudo-random sequence generator is initialized with $c_{init}=(\lfloor n_s/2 \rfloor+1)\cdot(2N_{ID}^{cell}+1)\cdot2^{16}+n_{RNTI}$ at the beginning of each subframe. N RNTI is an identifier of a wireless device.

The foregoing initialization method is applied when a URS is transmitted through a single antenna, and when a URS is transmitted through multiple antennas, a pseudo-random sequence generator is initialized with $c_{init}=(\lfloor n_s/2 \rfloor+1)\cdot(2N_{ID}^{(nSCID)}+1)\cdot2^{16}+n_{SCID}$ at the beginning of each subframe. nSCID is a parameter obtained from DL grant (for example, a DCI format 2B or 2C) related to PDSCH transmission.

A URS supports a multiple input multiple output (MIMO) transmission. An RS sequence for a URS may be spread by spreading sequences as follows according to antenna ports or layers.

TABLE 9

| layer | [w(0), w(1), w(2), w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1+ 1] |
| 8 | [−1 +1 +1 −1] |

A layer may be defined as an information path input to a precoder. A rank is a number of non-zero eigenvalue of a MIMO channel matrix, which is equal to the number of layers or the number of spatial streams. A layer may correspond to an antenna port discriminating between URSs and/or a spreading sequence applied to a URS.

Meanwhile, a PDCCH is monitored in a limited region called a control region within a subframe, and a CRS transmitted in the entire band is used for demodulating a PDCCH. As types of control data is diversified and an amount of control data is increased, flexibility of scheduling only with an existing PDCCH is lowered. Also, in order to reduce overhead due to CRS transmission, an enhanced PDCCH (EPDCCH) has been introduced.

Figure 8:
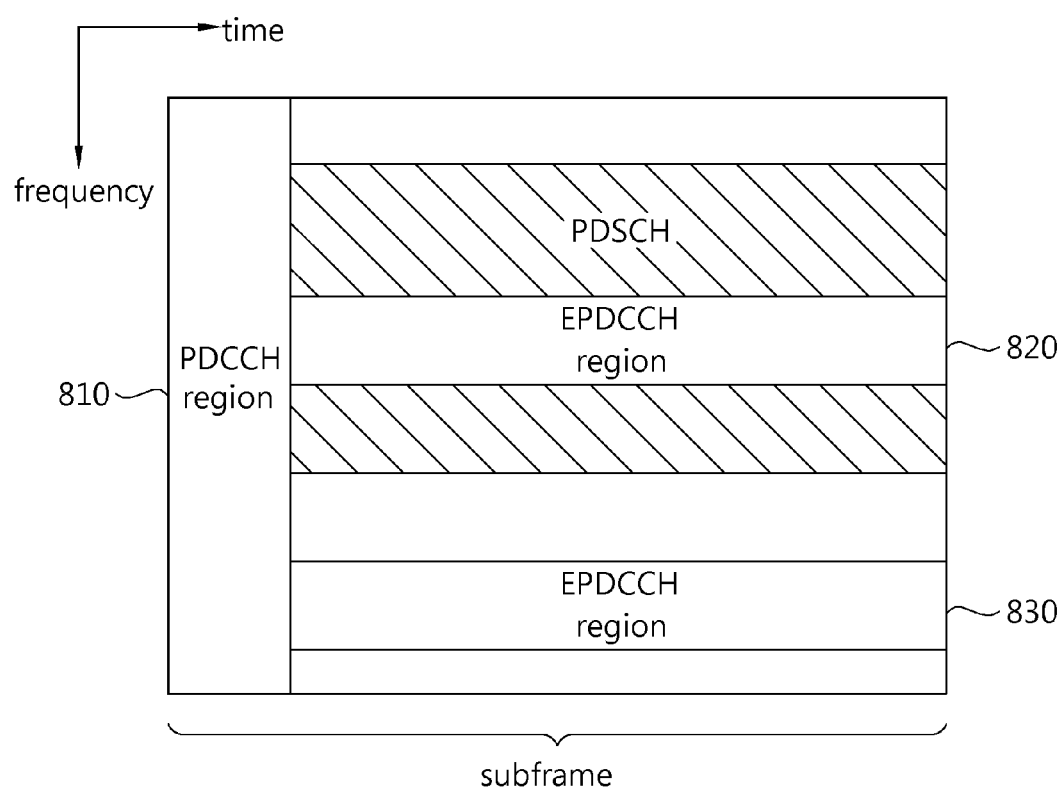
FIG. 8 is a view illustrating an example of a subframe having an EPDCCH.

FIG. 8 is a view illustrating an example of a subframe having an EPDCCH.

A subframe may include zero or one PDCCH region 810 and zero or more EPDCCH regions 820 and 830.

The EPDCCH regions 820 and 830 are region in which a UE monitors an EPDCCH. The PDCCH region 810 is positioned in first three or a maximum of four OFDM symbols of a subframe, while the EPDCCH regions 820 and 830 may be flexibly scheduled in OFDM symbols subsequent to the PDCCH region 810.

One or more EPDCCH regions 820 and 830 are designated in a UE, and the UE may monitor EPDCCH data in the designated EPDCCH regions 820 and 830.

The number, position, and size of the EPDCCH regions 820 and 830 and information regarding a subframe for monitoring an EPDCCH may be provided by a BS to a UE through a radio resource control (RRC) message, or the like.

In the PDCCH region 810, a PDCCH may be demodulated based on a CRS. In the EPDCCH regions 820 and 830, a DM-RS, not a CRS, may be defined for modulating EPDCCH. The DM-RS may be transmitted in the corresponding EPDCCH regions 820 and 830

An RS sequence for a DM-RS is equal to Equation 3. Here, m=0, 1, ..., $12N_{RB}^{max,DL}-1$, $N_{RB}^{max,DL}$ is a maximum number of RBs. A pseudo-random sequence generator may be initialized with $c_{init}=(\lfloor n_s/2 \rfloor+1)\cdot(2N_{ID,i}^{EPDCCH}+1)\cdot2^{16}+n_{SCID}^{EPDCCH}$ at the beginning of each subframe. ns is a slot number within a radio frame, $n_{ID,i}^{EPDCCH}$ is a cell index related to a corresponding EPDCCH region, and $n_{SCID}^{EPDCCH}$ is a parameter given from higher layer signaling.

The respective PEDCCH regions 820 and 830 may be used to schedule different cells. For example, an EPDCCH within the EPDCCH region 820 may carry scheduling information for a primary cell, and an PEDCCH within the EPDCCH region 830 may carry scheduling information for a secondary cell.

When EPDCCHs in the EPDCCH regions 820 and 830 are transmitted through multiple antennas, DM-RSs within the PEDCCH regions 820 and 830 may be subjected to precoding identical to that of the EPDCCHs.

Compared to the PDCCH using a CCE as a transmission resource unit, a transmission resource unit for an EPDCCH is known as an enhanced control channel element (ECCE). An aggregation level may be defined as a resource unit for monitoring an EPDCCH. For example, when 1 ECCE is a minimum resource for an PEDCCH, an aggregation level L may be defined as L={1, 2, 4, 8, 16}. Even in the EPDCCH region, a search space may be defined. A UE may monitor an EPDCCH candidate based on an aggregation level.

Figure 9:
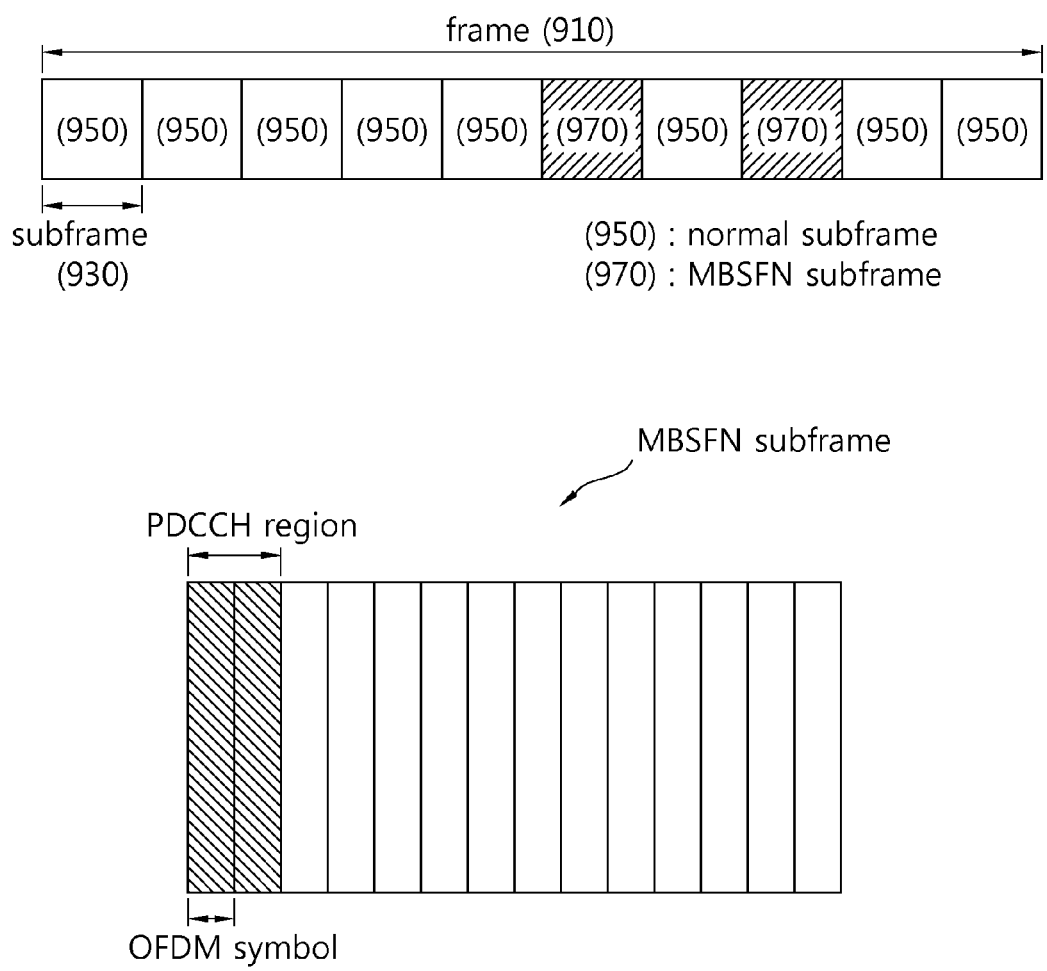
FIG. 9 is a conceptual view illustrating a structure of a multicast broadcast single frequency network (MBSFN).

FIG. 9 is a conceptual view illustrating a structure of a multicast broadcast single frequency network (MBSFN).

Referring to an upper part of FIG. 9, ten subframes included in a single frame 910 may include a normal subframe 950 used for transmitting and receiving normal data and an MBSFN subframe 970 that may be used for broadcasting or multicasting. The normal subframe 950 and the MBSFN subframe 970 may be different in the number of OFDM symbols, a length of CP, a structure of a CRS, and the number of CRSs. In the existing systems of LTE-Rel 8 and LTE-Rel 9, the MBSFN subframe 970 is used only for the purpose of transmitting broadcast or multicast data. However, based on LTE-Rel 10, the MBSFN subframe 970 may also used for the purpose of unicasting, i.e., data transmission with respect to a particular UE, as well as for the purpose of broadcasting or multicasting.

Referring to the lower part of FIG. 9, an MBSFN subframe may indicate a subframe in which a CRS is not transmitted in regions other than a PDCCH region 990 composed of first two OFDM symbols, as a subframe for transmitting a physical multicast channel (PMCH). The PDCCH region 990 may be a single OFDM symbol.

If a UE is not set for reception of an MBSFN subframe, the UE may not receive downlink data in the regions other than the PDCCH region 990. MBSFN configuration information is information for configuring an MBSFN subframe. The MBSFN configuration information may be transmitted through a higher layer signal. For example, a BS may transmit the MBSFN configuration information through an SIB-2 transmitted in a PDSCH. The MBSFN configuration information may include information such as a bitmap indicating an MBSFN subframe, a radio frame allocation period, a radio frame allocation offset, subframe allocation, and the like.

Figure 10:
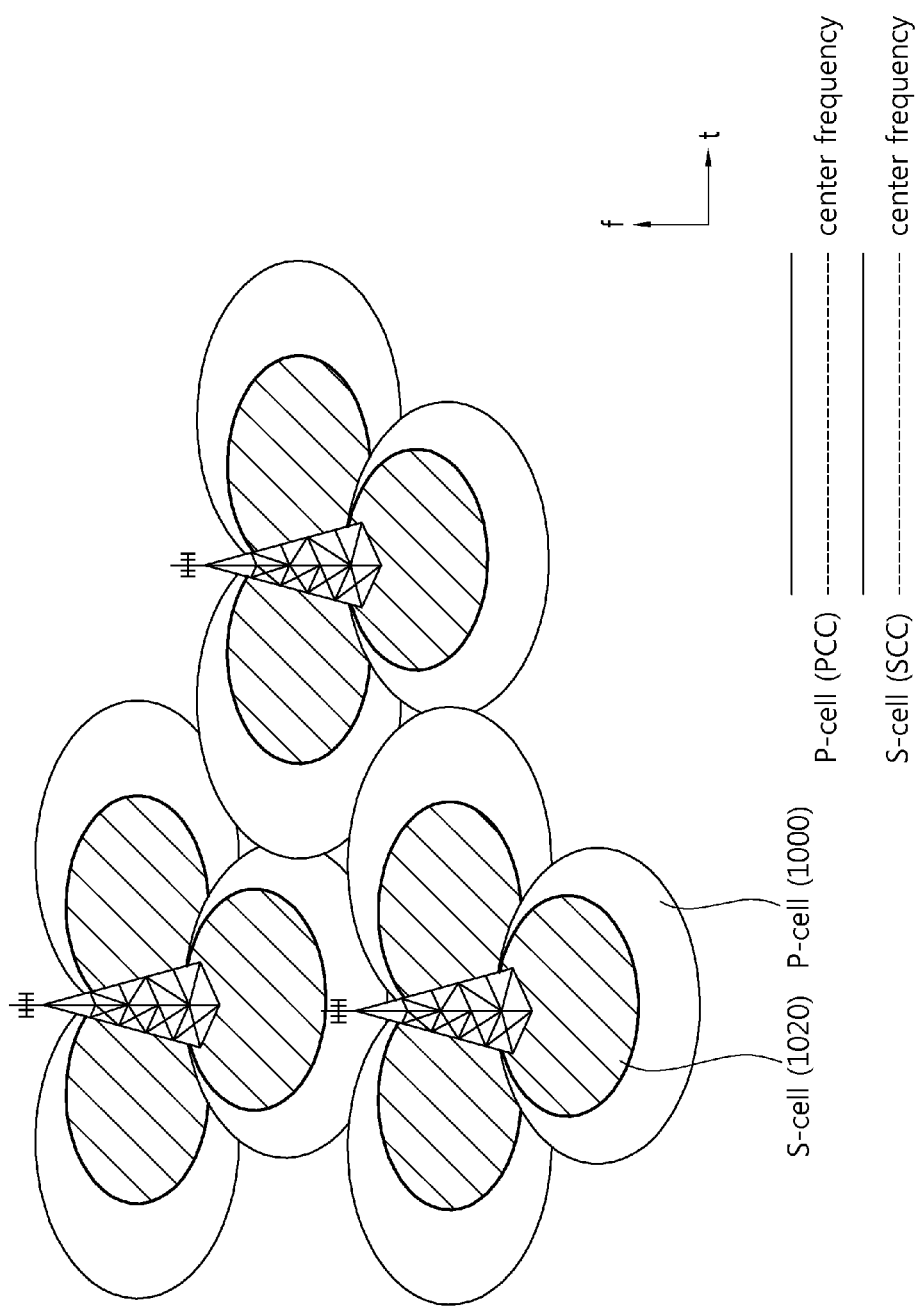
FIG. 10 is a conceptual view of a P-cell and an S-cell.

FIG. 10 is a conceptual view of a P-cell and an S-cell.

In FIG. 10, one of P-cell and S-cell deployment scenarios is illustrated for the purposes of description. P-cells and S-cells may be implemented in various manners. In general, a P-cell and an S-cell may indicate cells distinguished by frequencies. That is, a P-cell and an S-cell may have different center frequencies.

Referring to FIG. 10, a BS may perform carrier aggregation based on a PCC of a P-cell 1000 and SCCs of one or more S-cells 1020. In a case in which two or more cells exist, the BS may determine one cell as a P-cell 1000 and the other cells as S-cells 1020. The BS may aggregate CCs of the determined P-cell 1000 and S-cells 1020, and transmit data to a UE by using an aggregated frequency bandwidth. The UE may transmit data to the BS by using the aggregated frequency bandwidth. The P-cell 1000 and the S-cells 1020 illustrated in FIG. 10 are one of examples of scenarios of deploying P-cell 1000 and S-cells 1020, in which a transmission range of data transmitted based on a PCC of the P-cell 1000 is greater than a transmission range of data transmitted based on an SCC of the S-cell 1020.

The UE may perform radio resource control (RRC) connection through the PCC of P-cell 1000. Also, the UE may attempt random access to the BS through a physical random access channel (PRACH) based on a signal signaled through a PCC. Namely, the UE may perform an initial connection establishment or a connection reestablishment toward the BS through the PCC in the carrier aggregation environment.

The SCCs of the S-cell 1020 may be used to provide additional radio resource. In order to perform carrier aggregation to add the SCCs to the PCC, the UE needs to perform neighbor cell measurement to obtain information regarding neighbor cells. Based on the neighbor cell measurement performed by the UE, the BS may determine whether to aggregate the SCCs to the PCC. For example, the BS may transmit a legacy subframe through the PCC in the P-cell and transmit an NCT subframe as described hereinafter through the SCCs in the S-cell. The legacy subframe may be a subframe used as being distinguished from a subframe format defined before 3GPP LTE-A release 11 or an NCT subframe newly defined in 3GPP LTE release 12.

The BS may transmit PDCCH data to the UE through the PCC. The PDCCH data may include allocation information regarding PDCCH data transmitted through a downlink PCC band and SCC band and information acknowledging data transmission on uplink.

The P-cell 1000 and the S-cell 1020 may perform carrier aggregation through configuration and activation operations, and transmit and receive data through an aggregated frequency band.

FIG. 11 is a conceptual view illustrating a protocol for supporting a multimedia broadcast multicast service (MBMS).

In FIG. 11, an MBMS user plane and an MBMS control plane are illustrated as a protocol supporting MBMS.

A broadcast multicast service center (BM-SC) 1100 performs authorization with respect to MBMS bearer services and starts to provide a service. Also, the BM-SC 1100 handles scheduling and transmission in consideration of service quality with respect to MBMS content. The MB-SC 1100 may transmit broadcast content thereof to an LTE network or may interwork with an external content server to relay broadcast content. The BM-SC 1100 may use an SGmb interface to exchange a control message with an MBMS-gateway (MBMS-GW) 1120 and an SGi-mb interface to transmit user traffic (content). The MBMS-GW 1120 may perform a control (service start/termination) function with respect to an MBMS session, and deliver content to an eNB 1130 using an IP multicast transmission scheme. The MBMS-GW 1120 may use an Sm interface to exchange a control message with respect to a mobility management entity (MME) and an M1 interface to deliver user traffic to an eNB 1130.

An MME 1160 handles controlling with respect to an MBMS session, and has an M3 interface with a multi-cell/multicast coordination entity (MCE) 1170 for connection with the MCE 1170 and the MBMS-GW 1120. The MCE 1170 may perform management and allocation of radio resources with respect to eNBs 1130 belonging to the MCE 1170 and acceptance controlling with respect to an MBMS service. The MCE 1170 determines modularization and coding level (hereinafter, referred to as 'MCS') with respect to MBMS services, and performs controlling on an MBMS session.

The eNB 1130 receives information regarding radio resource allocated by the MCE 1170, actually allocates radio resources with respect to broadcast services scheduled by the MCE 1170, and performs synchronized transmission on MBMS services. The MCE 1170 has an M2 interface to deliver a control signal to the eNB 1130. A UE 1150 receives synchronized MBMS data. The MCE 1170 may be a logical node having a wireless access function such as the eNB 1130. The MCE 1170 may be physically separated from the eNB 1130 and centrally manage radio resources, or may be separately distributed to each eNB 1130 such that one eNB 1130 serves as a master and MCEs 1170 of the other remaining eNBs 1130 may serve as slaves.

In a protocol structure of a user plane for MBMS, an MBMS packet generated by the BM-SC 1100, which includes SYNC information for synchronized transmission of an air interface (or a radio section), is delivered to the MBMS-GW 1120 through tunneling, and the MBMS-GW 1120 delivers the SYNC information to the eNB 1130 in an IP multicast transmission manner. The eNB 1130 transmits a synchronized packet to the UE 1150 using the SYNC information. Based on an SYNC protocol, it can be known that the eNB 1130 may have information for synchronized transmission of a radio interface and whether packets transmitted from the BM-SC 110 has been lost. In MBMS, when the UE 1150 is within an MBSFN region, although a cell is changed, a PDCP needs to be maintained in the same state, and thus, a PDCP layer is positioned in the BM-SC 1100, unlike unicast.

While a UE is in an RRC_IDLE and RRC_CONNECTED state, an MBMS may be supported. Hereinafter, an operation of supporting an MBMS while a UE is in the RRC_IDLE and RRC_CONNECTED state will be described.

A UE in an RRC_IDLE state may perform the following operations.

While a UE is in an RRC_IDLE state, a UE-specific discontinuous reception (DRX) may be set by a higher layer. Also, UE-controlled mobility may be performed. In the RRC_IDLE state, the UE monitors a paging channel to detect an incoming call, a change in system information, an earthquake and tsunami warning system (ETWS) notification with respect to an ETWS-available UE, a commercial mobile alert service (CMAS) notification with respect to a CMAS-available UE. Also, in the RRC_IDLE state, the UE performs a neighbor cell measurement and cell (re)selection and obtains system information. Furthermore, the UE may perform logging to measure a location and time with respect to a logged measurement configured UE.

In the RRC_CONNECTED state, a UE may perform the following operations.

In the RRC_CONNECTED state, the UE may perform an operation of transmitting unicast data and an operation of receiving unicast data. Also, the UE may set to a UE-specific DRX in a lower layer. With respect to a UE supporting carrier aggregation, a P-cell and one or more S-cells may be used with respect to an increased bandwidth. Through network controlled mobility, for example, a cell change command may be performed together with handover with respect to GERAN and optional network assistance (NACC) with respect to the GERAN.

In the RRC_CONNECTED state, an operation of the UE monitors a paging channel and/or system information block type 1 content in order to detect a change in system information, ETWS notification with respect to ETWS-available UE(s), and a CMAS notification with respect to CMAS-available terminal(s). Also, in order to determine whether data is scheduled in the UE, the UE monitor a control channel associated with a shared data channel. The UE provides channel quality and feedback information, and performs neighbor cell measurement and measurement reporting. Also, the UE may obtain system information.

A multicast control channel (MCCH) as a logical channel transmitting control information of MBMS may have the following characteristics.

A single MBSFN region is related to a single MCCH and a single MCCH corresponding to an MBSFN region. The MCCH is transmitted in an MCH. The MCCH is composed of a single MBSFN area configuration RRC message. The single MBSFN area configuration RRC message may list every MBMS service together with an ongoing session and a selective MBMS counting request message. The MCCH is transmitted by every cell within an MBSFN region excluding an MBSFN area reserved cell. The MCCH is transmitted by an RRC at every MCCH repetition period. The MCCH uses a modification period. A notification mechanism may be used to mention a modification in the MCCH due to a session start or the presence of an MBMS counting request message. Notification may be periodically transmitted in an MBSFN subframe set to notify a modification in the MCCH through a preceding modification period. A DCI format 1C masked with an M-RNTI may be used for notification, and the MCCH may include 8-bit map for indicating one or more MBSFN areas in which the MCCH is changed. A UE may monitor one or more notification subframes per a modification period. When the UE receives a notification, the UE may obtain an MCCH within a next modification period boundary.

Figure 12:
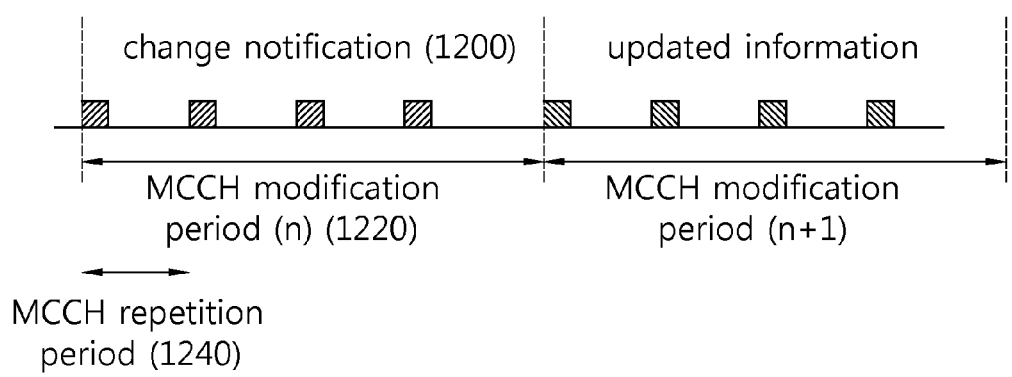
FIG. 12 is a conceptual view illustrating a method for transmitting changed MCCH information, when MCCH information is changed.

FIG. 12 is a conceptual view illustrating a method for transmitting changed MCCH information, when MCCH information is changed.

Referring to FIG. 12, MCCH information may be modified only in a particular radio frame. The same MCCH information may be transmitted several times at an MCCH repetition period 1240 within an MCCH modification period 1220. In a PDCCH, indication of an MBMS-specific RNTI (M-RNTI) may be used to inform a UE in an RRC_IDLE state or a UE in an RRC_CONNECTED state. In a PDCCH, an MCCH information change notification 1220 may be periodically transmitted and may be transmitted in an MBSFN subframe. An MBMS-available RRC_IDLE UE or an RRC_CONNECTED UE may obtain MCCH information.

System information that a UE receives in relation to an MBMS may be transmitted like SIB13 of Table 10 or like SIB15 of Table 11.

TABLE 10

```
SystemInformationBlockType13-r9 ::= SEQUENCE {
    mbsfn-AreaInfoList-r9          MBSFN-AreaInfoList-r9,
    notificationConfig-r9          MBMS-NotificationConfig-r9,
    lateNonCriticalExtension       OCTET STRING
    OPTIONAL, --Need OP
    ...
}
```

Referring to Table 10, SIB 13 may include information required for obtaining MBMS control information related to one or more MBSFN areas.

Mbsfn-AreaInfoList may include information regarding an MBSFN area identifier, information regarding an MCCH modification period, an MCCH offset, and information regarding an MCCH repetition period.

MBMS-NotificationConfig may include information regarding a radio frame in which MCCH information change notification is scheduled.

TABLE 11

```
SystemInformationBlockType15-r11 ::=SEQUENCE {
    sai-IntraFreq-r11                                        MBMS-SAI-List-r11
        OPTIONAL,             --Need OR
    sai-interFreqList-r11     MBMS-SAI-InterFreqList-r11    OPTIONAL, --Need OR
    lateNonCriticalExtension  OCTET STRING                  OPTIONAL, --Need OP
    ...
}
MBMS-SAI-List-r11 ::=          SEQUENCE (SIZE (1..maxSAI-MBMS-r11)) OF MBMS-SAI-r11
MBMS-SAI-r11::=                INTEGER (0..65535)
MBMS-SAI-InterFreqList-r11 ::= SEQUENCE (SIZE (1..maxFreq)) OF MBMS-SAI-InterFreq-r11
MBMS-SAI-InterFreq-r11 ::=         SEQUENCE {
    dl-CarrierFreq                     ARFCN-ValueEUTRA,
    sai-List-r11                       MBMS-SAI-List-r11,
    ...
}
```

Referring to Table 11, SIB 15 may include MBMS service area identities (SAI) of a current and/or neighbor carrier frequency.

sai-Inter-FreqList includes a list of neighbor frequencies providing an MBMS service and corresponding MBMS SAIs. sai-InterFreq includes a list of MBMS SAI with respect to a current frequency. sai-List includes a list of MBMS SAI with respect to a particular frequency.

In LTE Release 8/9/10 system, reference signals and channels such as CRS, PSS/SSS, PDCCH, PBCH, and the like, may be transmitted through respective downlink carriers. However, in a next LTE system, carriers in which the entirety or a portion of signals/channels, which are transmitted in a legacy LTE system, is not transmitted may be adopted for the reason of improvement of interference between a plurality of cells, enhancement of carrier expandability, and the like. Such a carrier may be called an extension carrier or a new carrier type (NCT) carrier. Hereinafter, a subframe in which such a carrier is transmitted may be defined as an NCT subframe and used. Hereinafter, in the embodiment of the present invention, a method for supporting an MBMS based on such an NCT subframe will be described. The NCT subframe is a term and the foregoing subframe may be expressed by various other terms.

In an LTE-A system supporting carrier aggregation, system information of an S-cell may be received from a P-cell when the S-cell is added to the P-cell. Thus, a UE may obtain system information of the S-cell from the P-cell without having to directly receive system information from the S-cell. However, the S-cell may be a P-cell to other UEs. Thus, even the S-cell may transmit system information.

However, in an NCT subframe, a common search space of a PBCH and a PDCCH may not be defined. Meanwhile, MBMS-related information may be transmitted through the common search space. For example, an MIB transmitted via the PBCH and SIB13 allocated by a CSS of a PDCCH may include MBMS-related information required for a UE to receive an MBMS. Hereinafter, in the embodiment of the present invention, a BS may transmit information required for providing an MBMS to a UE, and the information required for providing an MBMS will be defined as a term of MBMS-related information and used. For example, the information presented in Table 10 and Table 11 above may be MBMS-related information.

In a case in which an S-cell transmits an NCT subframe to a UE, since the NCT subframe does not define a common search space of a PBCH and a PDCCH, the UE may not able to receive MBMS-related information through the NCT subframe. Also, in the related art, when a UE is in an RRC_CONNECTED state or in an RRC_IDLE state, the UE may receive MBMS information. However, in case of an S-cell, since it is connected to a P-cell and operated, if the UE receives an NCT subframe from the S-cell, the RRC_IDLE state may be eliminated. Thus, in a case in which the NCT subframe is transmitted from the S-cell to the UE for an MBMS, MBMS-related information with respect to the S-cell needs to be separately transmitted to the UE. Hereinafter, in the embodiment of the present invention, it is assumed that the S-cell transmits an NCT subframe. Also, in the embodiment of the present invention, it is assumed that the S-cell and the P-cell are different BSs for the purposes of description. However, the P-cell and the S-cell may be implemented with different frequency bands in the same BS.

Figure 13:
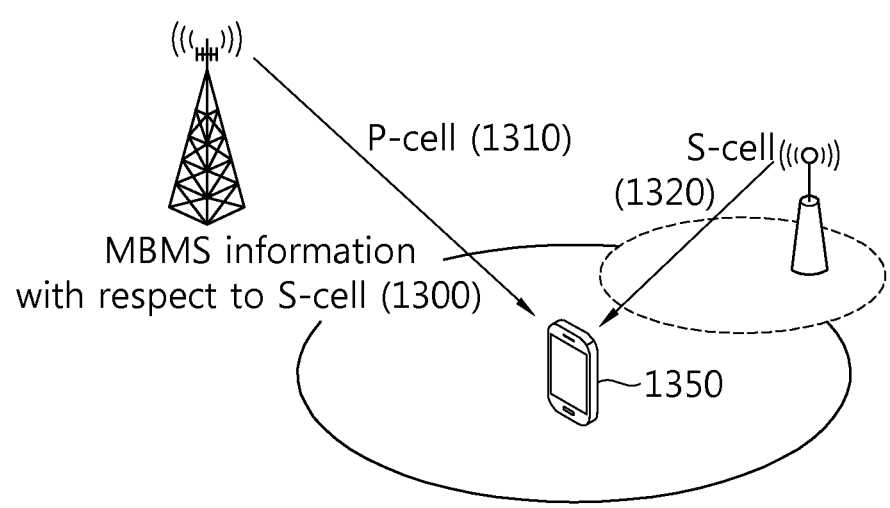
FIG. 13 is a conceptual view illustrating a method for transmitting MBMS-related information with respect to an S-cell to a user equipment (UE) according to an embodiment of the present invention.

FIG. 13 is a conceptual view illustrating a method for transmitting MBMS-related information with respect to an S-cell to a user equipment (UE) according to an embodiment of the present invention.

Referring to FIG. 13, in a case in which a UE is in an RRC_CONNECTED state, like the case in which the UE 1350 receives system information of the S-cell 1320 from the P-cell 1310 when the S-cell is added in the existing carrier aggregation, the UE may receive MBMS-related information with respect to the S-cell 1320 from the P-cell 1310 when the S-cell is added.

Also, when the MBMS-related information is changed, the P-cell 1310 may transmit the changed MBMS-related information with respect to the S-cell 1320 to the UE. In this case, the changed MBMS-related information with respect to the S-cell 1320 transmitted by the P-cell 1310 may be indicated by an S-cell index or identification information of the S-cell 1320 like a physical cell identifier of the S-cell 1320. The UE 1350 may determine whether the changed MBMS-related information is information related to the S-cell 1320 or information related to the P-cell 1310 based on the cell identifier information. The UE 1350 may be provided with changed MBMS service through the S-cell 1320 based on the MBMS-related information transmitted through the P-cell 1310.

Meanwhile, since the S-cell 1320 is not defined for the case in which the UE 1350 is in an RRC_IDLE state, when the UE 1350 is in the RRC_IDLE state, the S-cell 1320 may not support MBMS. Thus, MBMS information with respect to the S-cell 1350 may be received only in a situation in which the UE 1350 is in the RRC_CONNECTED state. It may be implemented such that a channel for transmitting MBMS-related information is additionally defined in an NCT subframe to transmit information regarding a change in MBMS-related information through the S-cell 1320, as well as through the P-cell 1310.

Figure 14:
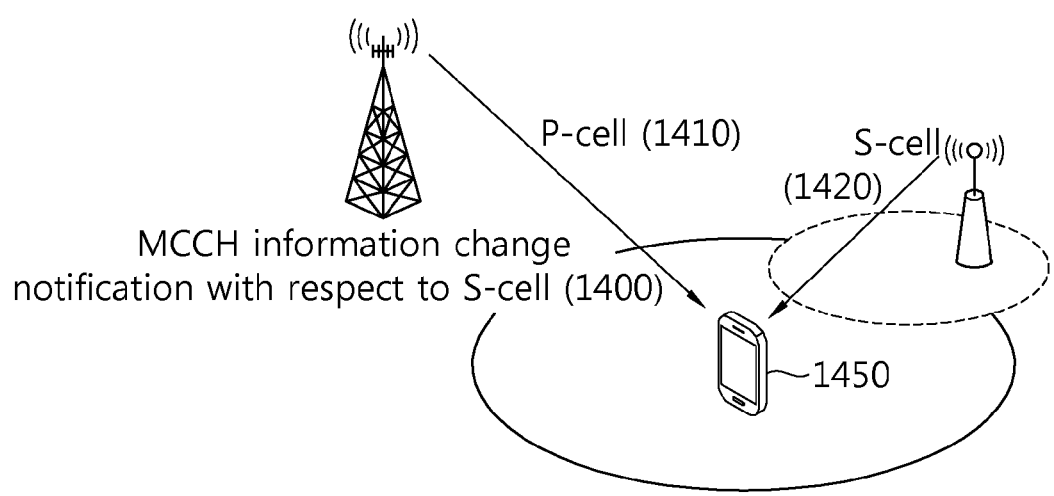
FIG. 14 is a conceptual view illustrating a method for notifying a UE about a change in MBMS-related information with respect to an S-cell according to an embodiment of the present invention.

FIG. 14 is a conceptual view illustrating a method for notifying a UE about a change in MBMS-related information with respect to an S-cell according to an embodiment of the present invention.

Changing of MBMS-related information may be made by notifying a change in MCCH information through an MCCH related information change notification. Hereinafter, in the embodiment of the present invention, the changed MBMS-related information will be referred to as MBMS change information. Changing of MCCH information may be made after providing information indicating that MCCH information will be changed to the UE in advance through notification during an MCCH modification period. The MCCH information change notification may be transmitted through a PDCCH of a DCI format 1C masked by using an M-RNTI. The M-RNTI is defined as an RNTI for MBMS. The MCCH information change notification may be periodically transmitted to the UE through an MBSFN subframe.

According to the embodiment of the present invention, various methods may be used to transmit MBMS change information with respect to the S-cell from the S-cell without definition of an RRC_IDLE state to the UE through the NCT subframe without definition of PDCCH.

Referring to FIG. 14, for example, an MCCH information change notification 1400 for transmitting MBMS change information with respect to an S-cell may be transmitted from a P-cell 1410 to a UE 1450. In this case, the MCCH information change notification and information regarding a change in MCCH information 1400 may be transmitted through an MBSFN subframe transmitted in the P-cell 1410 based on a configuration of an MBSFN subframe. MBSFN subframes of the P-cell 1410 and the S-cell 1420 may be configured to be identical. If MBSFN configurations of the P-cell 1410 and the S-cell 1420 are different, MBMS change information may be transmitted through an MBSFN subframe commonly defined by the P-cell 1410 and the S-cell 1420.

When the P-cell 1410 transmits the MCCH information change notification and information regarding a change in MCCH information 1400 through an MBSFN subframe, it may be discriminated whether it is information regarding the S-cell 1420 or information regarding the P-cell 1410. For example, the MCCH information change notification 1400 with respect to the S-cell may be generated based on identification information of the S-cell 1420 in order to be distinguished from MCCH information change notification with respect to the P-cell 1410.

Hereinafter, in the embodiment of the present invention, a different method for transmitting MBMS change information with respect to an S-cell to a UE will be described.

An S-cell is not defined for the case in which a UE is in an RRC_IDLE state, so in order to transmit a change in MCCH information with respect to the S-cell to a UE, first, it may be considered whether the UE is in an RRC_CONNECTED state. When the UE is in an RRC_IDLE state, MCCH information change notification with respect to a cell transmitting an NCT subframe may not be provided to the UE.

In order to transmit changed MBMS change information with respect to the S-cell to the UE, the S-cell may transmit information regarding a change in MCCH information through an EPDCCH as a control channel performing demodulation by using a DM-RS of the NCT subframe to the UE. Since a PDCCH is not defined in the NCT subframe, the MBMS change information with respect to the S-cell may be transmitted through the EPDCCH.

In transmitting the MBMS change information with respect to the S-cell to the UE, when an MBSFN subframe is transmitted from the S-cell in consideration of an MBSFN subframe configuration of the S-cell, the MBMS change information may be transmitted through the EPDCCH of the MBSFN subframe to the UE.

As another method of transmitting the MBMS change information with respect to the S-cell to the UE, a common search space (CSS) for MBMS transmission may be defined in the NCT subframe. MCCH information change notification with respect to the S-cell may be transmitted through the CSS defined in the NCT subframe. The S-cell may transmit the MBMS change information through a PDCCH masked with an M-RNTI or the EPDCCH in the CSS of the NCT subframe to the UE. The MBMS change information may be transmitted through DCI format 1C. Alternatively, the S-cell may transmit data corresponding to the DCI format 1C through the MBSFN subframe of the S-cell based on the PDCCH or the EPDCCH masked with the M-RNTI in the USS of the NCT subframe.

When the NCT subframe is used for MBMS, the MBSFN subframe may be configured to be different from the existing MBSFN subframe. Indices of sequential subframes included in a radio frame may be assumed as subframe #0 to subframe #9. For example, subframe #4 and subframe #9 (start index is 0) used for transmission of a paging channel in the NCT subframe may be additionally designated for the MBSFN subframe. Alternatively, the other remaining subframes, excluding the subframe #0 in which a PBCH of a radio frame is transmitted, may all be designated as MBSFN subframes.

Also, in order to distinguish between an MBSFN subframe transmitting a PDSCH and a subframe transmitting a PMCH, among MBSFN subframes, signaling indicating that the MBSFN subframe transmitting a PMCH may be added.

FIG. 15 is a conceptual view illustrating an NCT subframe set as an MBSFN subframe according to an embodiment of the present invention.

In FIG. 15, a method for indicating a PMCH in an NCT subframe set as an MBSFN subframe is illustrated. In FIG. 15, it is assumed that an NCT subframe and a legacy subframe provide an MBMS service together, while operating in a single frequency.

Referring to FIG. 15, two OFDM symbols positioned in a legacy subframe configured as an MBSFN subframe transmitted in a P-cell may be used for PDCCH transmission.

An NCT subframe configured as an MBSFN subframe transmitted in an S-cell may be configured as follows in consideration of PDCCH transmission of the legacy subframe configured as an MBSFN subframe transmitted in the P-cell.

Referring to an upper portion of FIG. 15, as a first method, in consideration of the positions of the OFDM symbols in which a PDCCH of the legacy subframe is transmitted, the NCT subframe configured as an MBSFN subframe may be set as a PMCH region 1520 from the third OFDM symbols of the MBSFN subframe.

Referring to a middle portion of FIG. 15, as a second method, without consideration of positions of OFDM symbols in which a PDCCH of the legacy subframe is transmitted, the NCT subframe may be set as a PMCH region 1540 from a first OFDM symbol of the MBSFN subframe.

Referring to a lower portion of FIG. 15, as a third method, positions of OFDM symbols in which a PDCCH of the legacy subframe is transmitted, may not be considered. A position 1550 of an OFDM symbol from which a PMCH transmission region 1560 of the NCT subframe configured as an MBSFN subframe starts may be set through L1 signaling or higher layer signaling. In this case, the higher layer signaling may include RRC signaling, MAC signaling, or the like.

Meanwhile, in case of a UE in an RRC_IDLE state, a UE-specific RRC message may not be received. Thus, the UE may not be able to receive MBMS-related information (e.g., MBMS-related content of SIB 13) though an NCT subframe in which an MIB or an SIB is not transmitted. Thus, the P-cell may transmit MBMS-related information with respect to an S-cell transmitting the NCT subframe to the UE. For example, the P-cell may include the MBMS-related information of the S-cell in an SIB of the P-cell and transmit the same. As mentioned above, the S-cell may directly transmit the MBMS-related information through an NCT subframe.

In the case in which the S-cell transmits the MBMS-related information through an NCT subframe, the MBMS-related information of the NCT subframe may be transmitted by using pre-set resource at a predefined period. Besides, the P-cell may transmit scheduling information for transmitting MBMS-related information though an NCT subframe to the UE, based on which the UE may receive the MBMS-related information through an NCT subframe.

Figure 16:
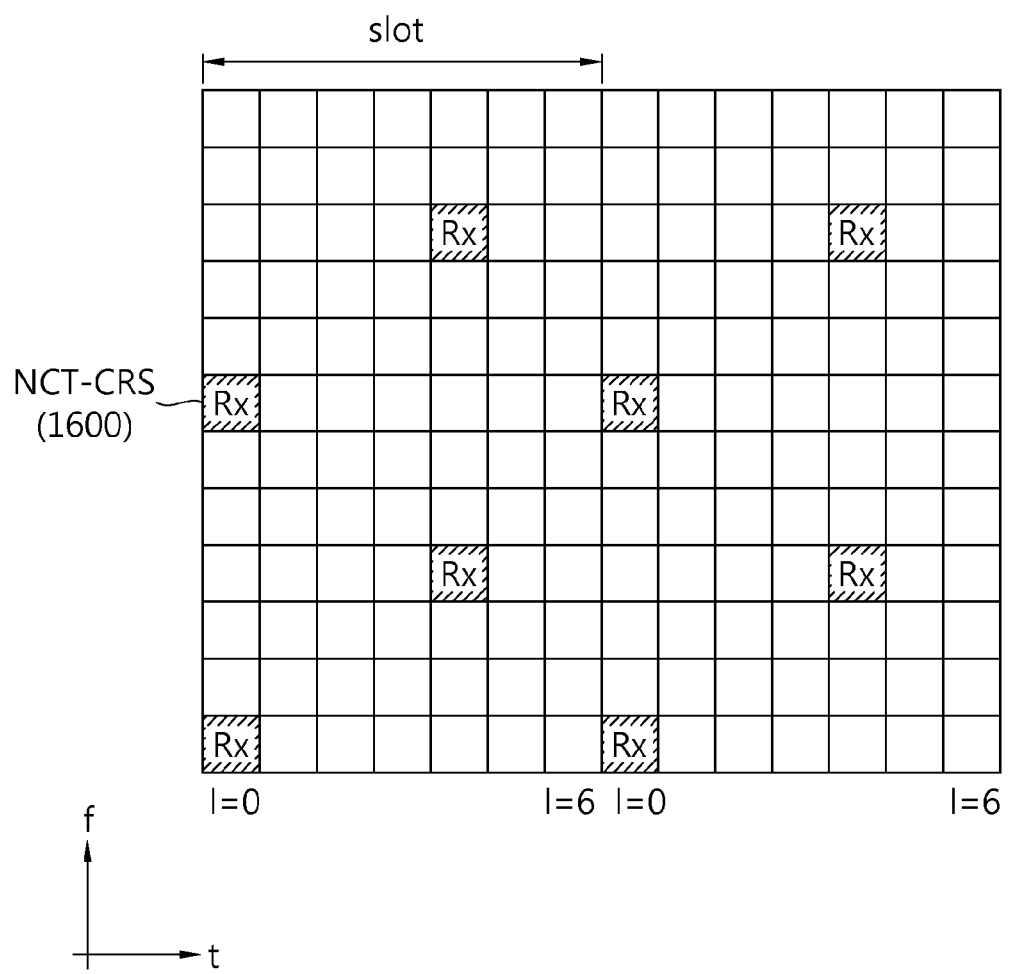
FIG. 16 is a conceptual view illustrating reference signals transmitted in an NCT subframe set as an MBSFN subframe according to an embodiment of the present invention.

FIG. 16 is a conceptual view illustrating reference signals transmitted in an NCT subframe set as an MBSFN subframe according to an embodiment of the present invention.

In FIG. 16, NCT-CRS, a reference signal transmitted through an NCT subframe configured as an MBSFN subframe, is illustrated. The NCT-CRS, a term, may be defined by using various terms such as RS, CRS, TRS, or the like.

An NCT frame including NCT subframes may include ten NCT subframes. The NCT frame may transmit a reference signal performing time/frequency tracking only in a particular subframe, rather than all the subframes included in the frame. The reference signal performing time/frequency tracking included in the NCT subframe and transmitted may be called a new carrier type cell-specific reference signal (NCT-CRS) 1600 or a tracking reference signal (TRS). Instead of the name of TRS, other terms such as enhanced synchronization signal (eSS) or reduced CRS may be used to express the reference signal performing time/frequency tracking included in the NCT subframe and transmitted.

The NCT-CRS 1600 (or TRS) may be set to have a transmission period of 1 or more periods and transmitted. For example, in a case in which a transmission period of the NCT-CRS is 2, the NCT-CRS may be transmitted in odd-numbered or even-numbered subframes at the transmission period of 2 ms.

The NCT-CRS 1600 may be transmitted through a particular subframe (for example, a subframe 0 or a subframe 5) in a single NCT frame. The NCT-CRS 1600 may be a reference signal defined to be transmitted in a particular resource element RE in a particular RB of the NCT subframe.

In the NCT subframe, PDSCH data may not be mapped to a resource element in which the NCT-CRS 1600 is set, and transmitted. Namely, in the NCT subframe, data rate matching may be performed on PDSCH data in consideration of a resource element in which the NCT-CRS 1600 is set. Another NCT subframe may b a subframe in which a resource element in which the NCT-CRS 1600 is set is punctured.

An antenna port for transmitting the NCT-CRS 1600 may be defined as an antenna port x. In a case in which a BS transmits the NCT-CRS 1600 to a UE through the antenna port x, the BS may not map data of PDSCH or EPDCCH in a resource element corresponding to the antenna port x transmitting the NCT-CRS 1600.

In FIG. 16, 'Rx' indicates a resource element in which the NCT-CRS 1600 with respect to the antenna port x is transmitted.

An additional antenna port for transmitting the NCT-CRS 1600 may be defined. For example, antenna port x to antenna port x+3 may be defined. In this case, ax indicates a resource element in which NCT-CRS 1600 with respect to the antenna port x is transmitted, 'Rx+1' indicates a resource element in which NCT-CRS 1600 with respect to an antenna port x+1 is transmitted, 'Rx+2' indicates a resource element in which NCT-CRS 1600 with respect to antenna port x+2 is transmitted, and 'Rx+3' indicates a resource element in which NCT-CRS 1600 with respect to an antenna port x+3 is transmitted.

A reference signal (RS) sequence rl,ns(m) for the NCT-CRS 1600 may be determined based on Equation 5 below, for example.

$$r_{l,ns}(m) = \frac{1}{\sqrt{2}}(1 - 2 \cdot c(2m)) + j\frac{1}{\sqrt{2}}(1 - 2 \cdot c(2m+1)) \qquad \langle\text{Equation 5}\rangle$$

Here, m=0, 1, . . . , $2N_{RB}^{max,DL}-1$, $N_{RB}^{max,DL}$ is a maximum number of RBs, ns is a slot number within a radio frame, 1 is an OFDM symbol index within a slot.

A pseudo-random sequence) c(i) is defined by a gold sequence having a length 31 as follows.

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$     <Equation 6>

Here, Nc=1600, and a first m-sequence is initialized with x1(0)=1, x1(n)=0, m=1, 2, . . . , 30. A second m-sequence is initialized with $c_{init}=2^{10} \cdot (7 \cdot (n_s+1)+l+1) \cdot (2 \cdot N_{ID}^{cell}+1)+ 2 \cdot N_{ID}^{cell}+N_{CP}$ in the beginning of each OFDM symbol. $N_{ID}^{cell}$ is a physical cell identifier (PCI) of a cell. In case of a normal CP, NCP=1, and in case of an extended CP, NCP=0.

Figure 17:
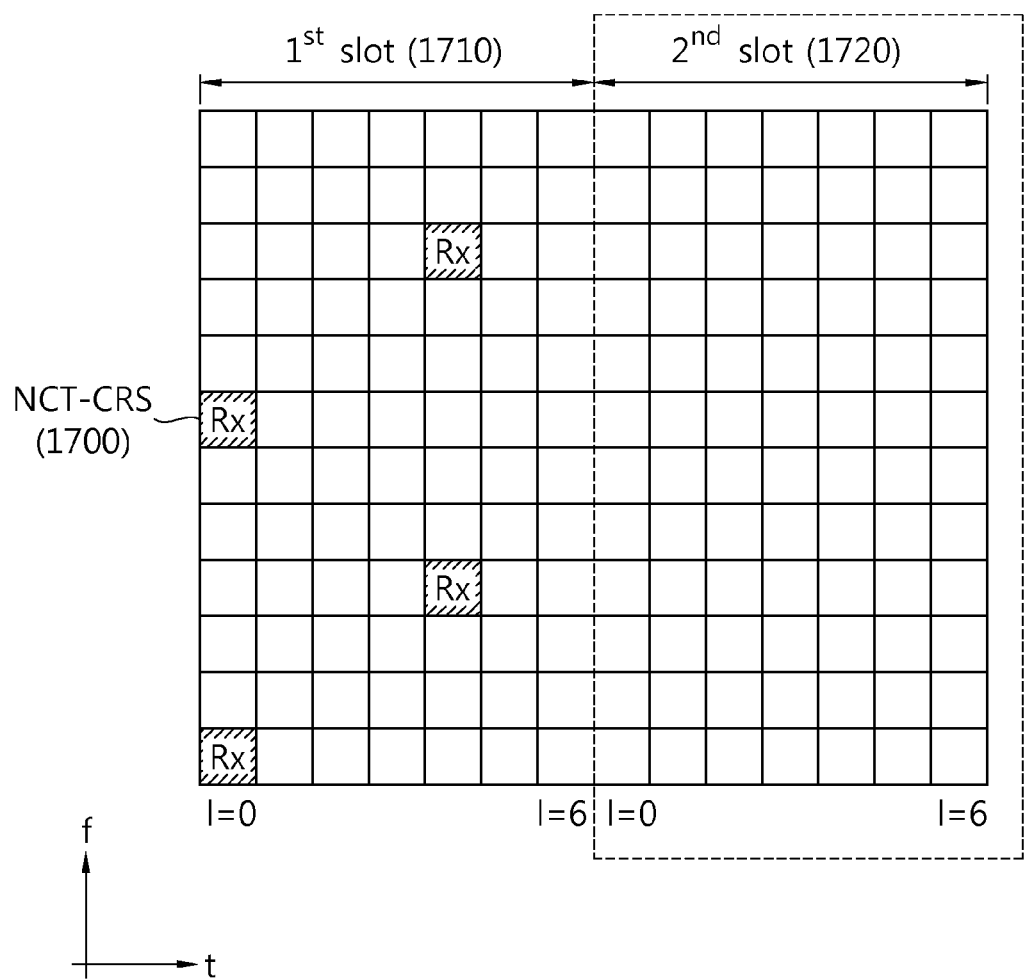
FIG. 17 is a conceptual view illustrating a method for transmitting an NCT-CRS in an NCT subframe set as an MBSFN subframe according to an embodiment of the present invention.

FIG. 17 is a conceptual view illustrating a method for transmitting an NCT-CRS in an NCT subframe set as an MBSFN subframe according to an embodiment of the present invention.

In FIG. 17, an NCT-CRS 1700 transmitted in the antenna port x is illustrated for the purposes of description.

Referring to FIG. 17, in a case in which the NCT-CRS 1700 is transmitted through an NCT subframe configured as an MBSFN subframe, the NCT-CRS 1700 is transmitted in a first slot of the MBSFN subframe and may not be transmitted through a second slot.

The UE may assume that the NCT-CRS 1700 is transmitted in a resource element RE corresponding to the antenna port x of a first slot 1710 of the subframe configured as an MBSFN subframe and the NCT-CRS 1700 is not transmitted in a resource element corresponding to the antenna port x of a second slot 1720, regardless of a transmission mode.

The NCT-CRS 1700 corresponding to the antenna port x may be transmitted in the first slot 1710 and the second slot 1720 of the NCT subframe configured as an MBSFN subframe as illustrated in FIG. 16. In another method, whether to transmit the NCT-CRS 1700 may be determined according to whether a PMCH is transmitted in the NCT subframe configured as an MBSF subframe. For example, an NCT subframe configured as an MBSFN subframe in which a PMCH is transmitted may not transmit the NCT-CRS 1700, and only an NCT subframe configured as an MBSFN subframe in which a PMCH is not transmitted may transmit the NCT-CRS 1700. A UE may assume whether NCT-CRS is transmitted in the MBSFN subframe based on whether a PMCCH is transmitted I n the MBSFN subframe.

FIG. 18 is a conceptual view illustrating a method for transmitting an NCT-CRS in an NCT subframe set as an MBSFN subframe according to an embodiment of the present invention.

In existing legacy subframes, in a case in which a duplexing scheme is FDD, subframes 1, 2, 3, 6, 7, and 8, excluding subframe 0, subframe 4, subframe 5, and subframe 9, may be configured as MBSFN subframes. In a legacy frame, subframes 0, 4, 5, and 9 may be used to transmit a paging message by a higher layer configuration, so they cannot be configured as subframes. Also, in the legacy frame, subframes 0 and 5 may be used for transmitting a primary synchronization signal (PSS) and a secondary synchronization signal (SSS) and the subframe 0 may be used for transmitting a PBCH, so they cannot be configured as MBSFN subframes. However, in the NCT subframe, receiving of a PBCH or a paging message may not be required. Thus, the subframes 0, 4, 5, and 9, which may not be configured as MBSFN subframes in the related art, may be configured as MBSFN subframe and used. For example, subframe 4 and subframe 9 may be configured as MBSFN subframes and used.

Referring to FIG. 18, in the NCT frame, subframes, other than NCT subframe 0 1800 and NCT subframe 5 1850, may be configured as MBSFN subframes.

The subframes configured as MBSFN subframes may also be separately set to an NCT subframe in which a PMCH is transmitted and an NCT subframe in which a PDSCH is transmitted. The NCT-CRS may be set to be transmitted in the entire OFDM symbols corresponding to a subframe in which a PMCH is not transmitted among the NCT subframes configured as MBSFN subframes. In case of the subframe in which the PMCH is transmitted Among the NCT subframes configured as MBSFN subframes, the NCT-CRS may be transmitted only in a single slot as illustrated in FIG. 17 or may be transmitted in particular OFDM symbols.

Namely, a BS may configure at least one subframe among a plurality of subframes included in a downlink radio frame, as an MBSFN subframe. The BS may determine whether to allocate resource with respect an NCT-CRS in the MBSFN subframe configured based on whether a PMCH is transmitted in the configured MBSFN subframe. The BS may transmit the NCT-CRS through an MBSFN subframe in which a PMCH is not transmitted among the configured MBSFN subframes.

Besides, the subframe 0 1800 and the subframe 5 1850 may be configured as MBSFN subframes and used. The subframe 0 1800 and the subframe 5 1850 are subframes in which the PSS and SSS are transmitted, and thus, in the case of using the corresponding subframes for PMCH transmission, the UE may not transmit PMCH data in the resource elements in which the PSS and SSS are transmitted. For example, in the subframe 0 1800 and the subframe 5 1850, the NCT-CRS may be transmitted only in the second slot.

According to the embodiment of the present invention, the NCT-CRS of a subframe configured as an MBSFN subframe among the NCT subframes set with a normal CP may be transmitted based on an extended CP. Also, the UE may assume that the NCT-CRS is not transmitted in the resource element in which the MBSFN RS is transmitted.

Figure 19:
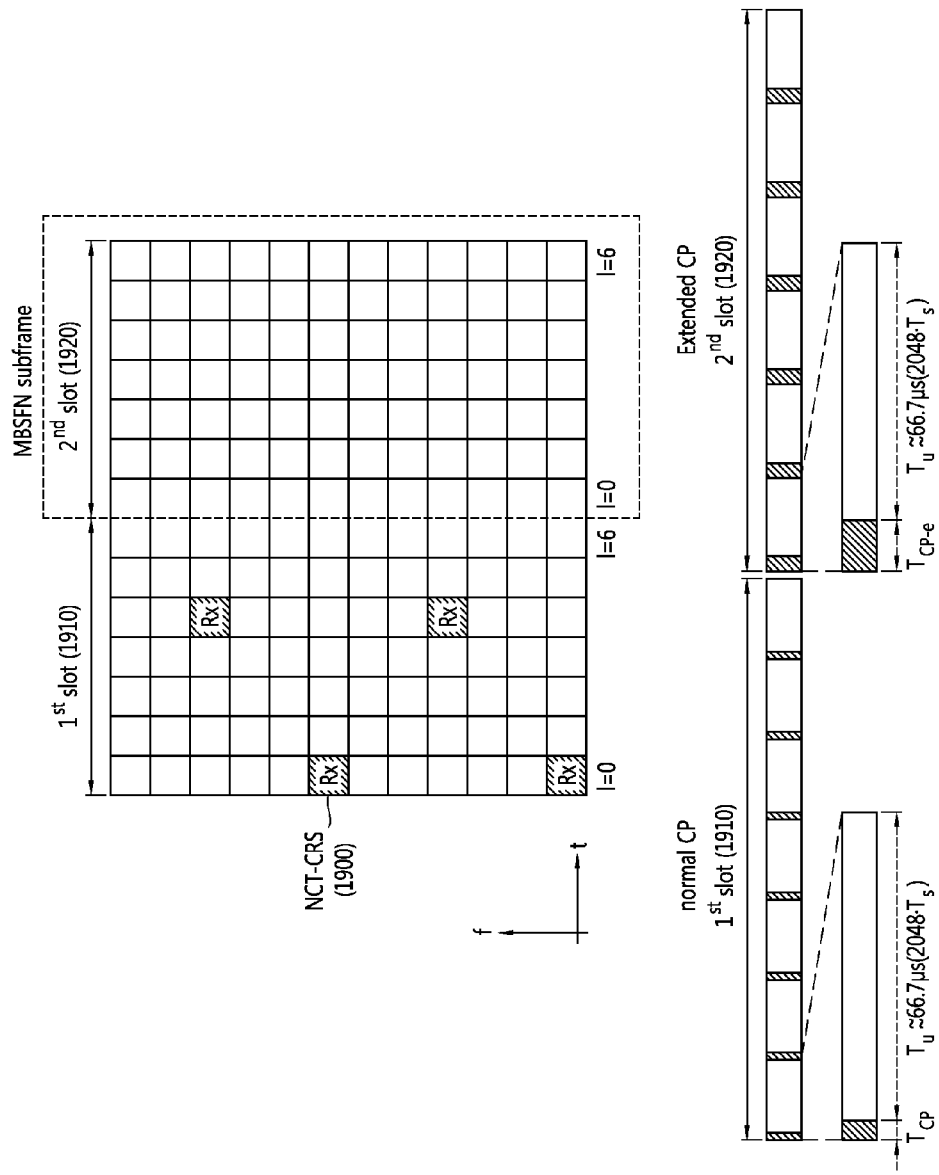
FIG. 19 is a conceptual view illustrating a structure of a subframe in transmitting an NCT-CRS in an NCT subframe set as an MBSFN subframe according to an embodiment of the present invention.

FIG. 19 is a conceptual view illustrating a structure of a subframe in transmitting an NCT-CRS in an NCT subframe set as an MBSFN subframe according to an embodiment of the present invention.

Referring to an upper portion of FIG. 19, in a case in which NCT_CRS is transmitted in a first slot 1910 of the NCT subframe configured as an MBSFN subframe, only a second slot 1920 of the corresponding subframe may be used for transmission of the MBSFN subframe.

Referring to a lower portion of FIG. 19, CP configuration of the first slot 1910 and the second slot 1920 of the NCT subframe configured as an MBSFN subframe may be different. The first slot 1910 transmitting the NCT-CRS may be configured with a normal CP or an extended CP, and the second slot 1920 used as an MBSFN subframe may be configured with an extended CP. In the subframe 0 or the subframe 5 identical to the subframe transmitting a PSS and SSS may transmit the NCT-CRS based on the foregoing method.

Also, according to the embodiment of the present invention, in order to enhance spectral efficiency of MBMS data, MIMO transmission may be considered. For MIMO transmission, transmit diversity or spatial multiplexing (SU-MIMO/MU-MIMO) may be considered.

A plurality of MBMS data may be transmitted to a single terminal by using spatial multiplexing, single MBMS data may be transmitted to a single UE through a plurality of layers, or a plurality of UEs may be multiplexed in a MU-MIMO manner.

In order to demodulate MIMO transmission, an MBSFN RS corresponding to antenna port y (y is a natural number, not 4), other than an existing antenna port 4, may be defined. RS of the antenna port y should be orthogonal with the antenna port 4, and orthogonal cover of SF=3 (for example, a DFT sequence such as [1 1 1], [1 $e^{j2\pi/3}$ $e^{j4\pi/3}$], [1 $e^{j4\pi/3}$ $e^{j2\pi/3}$], or the like, may be used in a time domain or orthogonal cover of SF=2 (e.g., Walsh/Hadamard sequence such as [1 1], [1−1], or the like, may be used in a space domain.

According to an additional embodiment of the present invention, instead of the NCT-CRS (or a tracking reference signal, a CSI-RS may be transmitted in an MBSFN subframe and used to check whether a UE is maintained in synchronization and search for a cell. For example, a case in which a cell performs an ON/OFF operation may be assumed. Even in a case in which the cell is in an OFF state, an MBMS service with respect to a UE may be performed, and in this case, the CSI-RS may be transmitted to check whether a UE which has received the CSI-RS is maintained in synchronization and detect a cell.

Figure 20:
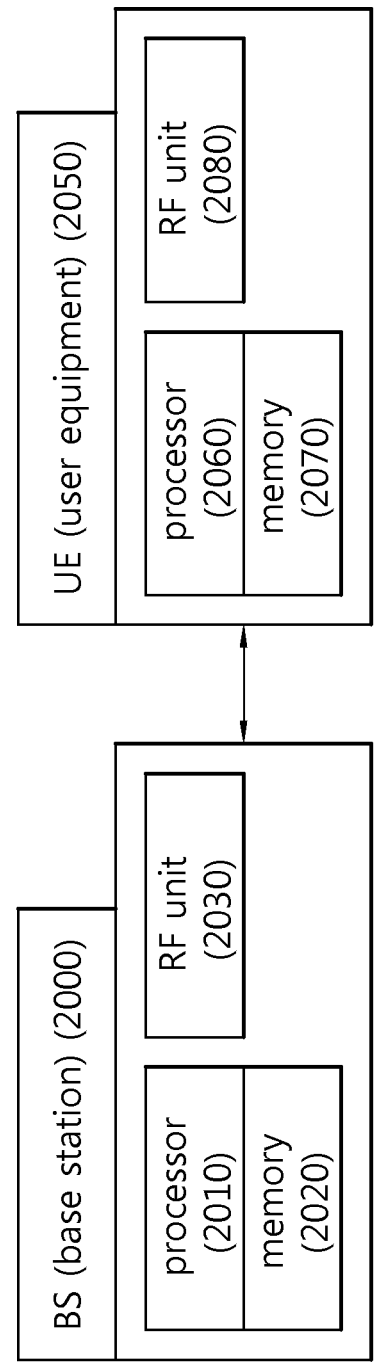
FIG. 20 is a block diagram illustrating a wireless communication system according to an embodiment of the present invention.

FIG. 20 is a block diagram illustrating a wireless communication system according to an embodiment of the present invention.

Referring to FIG. 20, a BS 2000 includes a processor 2010, a memory 2020, and a radio frequency (RF) unit 2030. The memory 2020 is connected to the processor 2010 and stores various types of information for driving the processor 2010. The RF unit 2020 is connected to the processor 2010 to transmit and/or receive a radio signal. The processor 2010 implements proposed functions, processes, and/or methods. In the aforementioned embodiment, the operations of the BS may be implemented by the processor 2010.

A wireless device 2050 includes a processor 2060, a memory 2070, and an RF unit 2080. The memory 2070 is connected to the processor 2060 and stores various types of information for driving the processor 2060. The RF unit 2080 is connected to the processor 2060 to transmit and/or receive a radio signal. The processor 2060 implements proposed functions, processes, and/or methods. In the aforementioned embodiment, the operations of the wireless device may be implemented by the processor 2060.

For example, the processor 2060 may configure at least one subframe, among a plurality of subframes included in a downlink radio frame, to an MBSFN subframe, determine resource allocation with respect to a tracking reference signal in the at least one configured MBSFN subframe based on whether a physical multicast channel (PMCH) is transmitted in the configured MBSFN subframe, and transmit a tracking reference signal through an MBSFN subframe in which the PMCH is not transmitted, among the at least one configured MBSFN subframe.

The processor may include an ASIC (Application-Specific Integrated Circuit), a chip set, a logical circuit and/or a data processor. The memory may include a ROM (Read-Only Memory), a RAM (Random Access Memory), a flash memory, a memory card, a storage medium, and/or any other storage devices. The RF unit may include a baseband circuit for processing a radio signal. When the embodiments are implemented by software, the foregoing techniques may be implemented by modules (processes, functions, or the like) performing the foregoing functions. The modules may be stored in the memory and executed by the processor. The memory may be provided within or outside the processor, or may be connected to the processor through a well-known unit.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

What is claimed is:

1. A method for multimedia broadcast and multicast service (MBMS), performed by a user equipment (UE), the method comprising:
    receiving from a primary cell (P-cell) first system information of a secondary cell (S-cell) aggregated with the P-cell;
    receiving second system information for the MBMS;
    receiving data from the S-cell based on the MBMS;
    receiving a first multicast control channel (MCCH) information change notification from the S-cell by monitoring a physical downlink control channel (PDCCH) masked based on an MBMS radio network temporary identifier (M-RNTI),
    wherein for receiving the first MCCH information change notification, the PDCCH is monitored on a common search space (CSS) of the S-cell; and
    receiving, via the MCCH, updated MBMS information based on the first MCCH information change notification,
    wherein the first MCCH information change notification is repeated in a first MCCH modification period, and
    wherein the updated MBMS information is repeated in a second MCCH modification period which is next to the first MCCH modification period.

2. The method of claim 1, wherein the first MCCH information change notification is transmitted via a multicast broadcast single frequency network (MBSFN) subframe of the S-cell.

3. The method of claim 1, wherein the UE is available to receive the first MCCH information change notification only when the UE is in a radio resource control connected (RRC_CONNECTED) state.

4. The method of claim 1 further comprising:
    receiving a second MCCH information change notification from the P-cell, and
    receiving, via the MCCH, updated information based on the second MCCH information change notification,
    wherein the UE is available to receive the second MCCH information change notification when the UE is in a radio resource control idle (RRC_IDLE) state or an RRC_CONNECTED state, and
    wherein the second MCCH information change notification is transmitted via a multicast broadcast single frequency network (MBSFN) subframe of the P-cell.

5. The method of claim 4,
    wherein the first MCCH information change notification is transmitted via a MBSFN subframe of the S-cell,
    wherein the second MCCH information change notification is transmitted via a MBSFN subframe of the P-cell,
    wherein the MBSFN subframe of the P-cell is at least one of subframe 1, subframe 2, subframe 3, subframe 6, subframe 7 and subframe 8 in a frequency division duplex (FDD) frame, and
    wherein the MBSFN subframe of the S-cell is at least one of subframe 1, subframe 2, subframe 3, subframe 6, subframe 7 and subframe 8 in an FDD frame.

6. The method of claim 1, wherein the second system information for the MBMS is received from the P-cell, but is applied to the S-cell.

7. A wireless device adapted for receiving a multimedia broadcast and multicast service (MBMS), the wireless device comprising:

a radio frequency (RF) transceiver that transmits or receives a radio signal; and
a processor operatively coupled with the RF transceiver, wherein the processor controls the RF transceiver to:
receive from a primary cell (P-cell) first system information of a secondary cell (S-cell) aggregated with the P-cell;
receive second system information for the MBMS;
receive data from the S-cell based on the MBMS;
receive a first multicast control channel (MCCH) information change notification from the S-cell by monitoring a physical downlink control channel, PDCCH, masked based on an MBMS radio network temporary identifier (M-RNTI),
wherein the PDCCH is monitored on a common search space (CSS) of the S-cell; and
receive, via the MCCH, updated MBMS information based on the first MCCH information change notification,
wherein the first MCCH information change notification is repeated in a first MCCH modification period, and
wherein the updated MBMS information is repeated in a second MCCH modification period which is next to the first MCCH modification period.

8. The wireless device of claim 7, wherein the processor further controls the RF transceiver to receive the first MCCH information change notification via a multicast broadcast single frequency network (MBSFN) subframe of the S-cell.

9. The wireless device of claim 7, wherein the processor further controls the RF transceiver to receive the first MCCH information change notification when the wireless device is in a radio resource control connected (RRC_CONNECTED) state.

10. The wireless device of claim 7,
wherein the processor further controls the RF transceiver to:
receive a second MCCH information change notification from the P-cell; and
receive, via the MCCH, updated information based on the second MCCH information change notification,
wherein the processor further controls the RF transceiver to receive the second MCCH information change notification when the wireless device is in a radio resource control idle (RRC_IDLE) state or an RRC_CONNECTED state, and
wherein the second MCCH information change notification is received via a multicast broadcast single frequency network (MBSFN) subframe of the P-cell.

11. The wireless device of claim 10,
wherein the first MCCH information change notification is received via a MBSFN subframe of the S-cell,
wherein the second MCCH information change notification is received via a MBSFN subframe of the P-cell,
wherein the MBSFN subframe of the P-cell is at least one of subframe 1, subframe 2, subframe 3, subframe 6, subframe 7 and subframe 8 in a frequency division duplex (FDD) frame, and
wherein the MBSFN subframe of the S-cell is at least one of subframe 1, subframe 2, subframe 3, subframe 6, subframe 7 and subframe 8 in a FDD frame.

\* \* \* \* \*